United States Patent
Bajor et al.

(10) Patent No.: US 11,402,458 B2
(45) Date of Patent: Aug. 2, 2022

(54) CIRCUITS AND METHODS FOR USING COMPRESSIVE SAMPLING TO DETECT DIRECTION OF ARRIVAL OF A SIGNAL OF INTEREST

(71) Applicant: The Trustees of Columbia University in the City of New York, New York, NY (US)

(72) Inventors: Matthew Bajor, Bayonne, NJ (US); John Wright, New York, NY (US); Tanbir Haque, Jackson Heights, NY (US); Peter R. Kinget, Summit, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 409 days.

(21) Appl. No.: 16/420,108

(22) Filed: May 22, 2019

(65) Prior Publication Data

US 2019/0361088 A1    Nov. 28, 2019

Related U.S. Application Data

(60) Provisional application No. 62/674,930, filed on May 22, 2018.

(51) Int. Cl.
    *G01S 5/02*      (2010.01)
    *H04B 7/06*      (2006.01)
    (Continued)

(52) U.S. Cl.
    CPC ............ *G01S 5/0215* (2013.01); *G01S 3/043* (2013.01); *G01S 3/143* (2013.01); *H04B 7/0617* (2013.01)

(58) Field of Classification Search
    CPC ......... G01S 5/0215; G01S 3/043; G01S 3/143
    (Continued)

(56) References Cited

U.S. PATENT DOCUMENTS

| 5,001,441 A | 3/1991 | Gen-Kuong |
| 5,629,956 A | 5/1997 | Durrant et al. |

(Continued)

FOREIGN PATENT DOCUMENTS

| EP | 2662706 | 9/2015 |
| WO | WO 2013152022 | 10/2013 |

OTHER PUBLICATIONS

Adams, D., et al., "A Mixer Frontend for a Four-Channel Modulated Wideband Converter with 62 dB Blocker Rejection", In IEEE Radio Frequency Integrated Circuits Symposium (RFIC), San Francisco, CA, US, May 22-24, 2016, pp. 286-289.

(Continued)

*Primary Examiner* — Bo Fan
(74) *Attorney, Agent, or Firm* — Byrne Poh LLP

(57) ABSTRACT

Mechanisms compressive sampling to detect direction of arrival (DoA) of a signal of interest (SoI), comprising: in each of a plurality of receiver paths, receiving the SoI and producing a received signal using an antenna; and using a modulator to: receive a modulator input signal (MIS) based on the received signal produced by the antenna in the path; modulate the MIS at multiple points in time (MPIT) based on different ones of a plurality of pseudo-random numbers; and produce a plurality of modulated output signals in response to the modulating of the MIS at the MPIT; summing across the receiver paths the one of the modulated output signals produced by each of the receiver paths for each of the MPIT, to produce a plurality of sum signals each (Continued)

corresponding to one of the MPIT; and performing a compressed sensing recovery algorithm to recover the DoA of the SoI.

20 Claims, 12 Drawing Sheets

(51) Int. Cl.
  *G01S 3/14* (2006.01)
  *G01S 3/04* (2006.01)
(58) Field of Classification Search
  USPC .................................... 342/386, 451, 463
  See application file for complete search history.

(56) References Cited

U.S. PATENT DOCUMENTS

| | | | |
|---|---|---|---|
| 5,640,416 | A | 6/1997 | Chalmers |
| 6,163,696 | A | 12/2000 | Bi et al. |
| 6,351,290 | B1 | 2/2002 | Limberg |
| 6,621,804 | B1 | 9/2003 | Holtzman et al. |
| 6,882,834 | B1 | 4/2005 | Balboni |
| 7,103,316 | B1 | 9/2006 | Hall |
| 7,266,360 | B2 | 9/2007 | Kang et al. |
| 7,787,852 | B2 | 8/2010 | Rofougaran |
| 8,166,084 | B2 | 4/2012 | Hahn et al. |
| 8,285,243 | B2 | 10/2012 | Kang et al. |
| 8,391,340 | B2 | 3/2013 | Weill |
| 8,457,579 | B2 | 6/2013 | Mishali et al. |
| 8,571,504 | B2 | 10/2013 | Robert et al. |
| 8,594,603 | B2 | 11/2013 | Balankutty et al. |
| 8,629,714 | B2 | 1/2014 | Ng et al. |
| 8,761,065 | B2 | 6/2014 | Stephens et al. |
| 8,836,557 | B2 | 9/2014 | Eldar et al. |
| 8,971,911 | B2 | 3/2015 | Barnawi |
| 9,065,504 | B2 | 6/2015 | Kwon et al. |
| 9,191,891 | B2 | 11/2015 | Jafarian et al. |
| 9,413,420 | B1 | 8/2016 | Kong |
| 2001/0041548 | A1 | 11/2001 | Bult et al. |
| 2004/0266356 | A1 | 12/2004 | Javor et al. |
| 2006/0222116 | A1 | 1/2006 | Hughes et al. |
| 2006/0103362 | A1 | 5/2006 | Eberlein |
| 2006/0153155 | A1* | 7/2006 | Jacobsen ............... H04L 1/1829 370/338 |
| 2006/0198474 | A1 | 9/2006 | Sorrells et al. |
| 2008/0069183 | A1 | 3/2008 | Terada |
| 2008/0108318 | A1 | 5/2008 | Min et al. |
| 2008/0214139 | A1 | 9/2008 | Conta et al. |
| 2009/0066446 | A1 | 3/2009 | Sahu et al. |
| 2009/0267655 | A1 | 10/2009 | Chen et al. |
| 2009/0323779 | A1 | 12/2009 | Lennen |
| 2010/0302100 | A1 | 12/2010 | Yang et al. |
| 2011/0007780 | A1 | 1/2011 | Shimoni |
| 2011/0221518 | A1 | 9/2011 | Romero |
| 2012/0235801 | A1 | 9/2012 | Cho et al. |
| 2012/0249234 | A1 | 10/2012 | Robert et al. |
| 2012/0252394 | A1 | 10/2012 | Balakrishnan et al. |
| 2012/0314822 | A1 | 12/2012 | Gupta |
| 2013/0136154 | A1 | 5/2013 | Chomal et al. |
| 2013/0149983 | A1 | 6/2013 | Fahim et al. |
| 2013/0286903 | A1 | 10/2013 | Khojastepour et al. |
| 2013/0336368 | A1 | 12/2013 | Arima et al. |
| 2014/0070987 | A1 | 3/2014 | Jarvis et al. |
| 2014/0099901 | A1 | 4/2014 | Ruegamer et al. |
| 2014/0269849 | A1 | 9/2014 | Abdelmonem et al. |
| 2014/0323071 | A1 | 10/2014 | Liao |
| 2014/0370833 | A1 | 12/2014 | Din et al. |
| 2015/0072635 | A1 | 3/2015 | Atalla et al. |
| 2015/0105067 | A1 | 4/2015 | Vallaippan |
| 2016/0211872 | A1 | 7/2016 | Sim et al. |
| 2017/0026066 | A1 | 1/2017 | Kinget et al. |

OTHER PUBLICATIONS

Agilent Technologies, "Fundamentals of RF and Microwave Noise Figure Measurements", Technical Paper, Application Note 57-1, Aug. 5, 2010, pp. 1-31.
Agilent Technologies, "Spectrum Analysis Basics", Technical Paper, Application Note 150, Feb. 25, 2014, pp. 1-89.
Alink, M.S.O., et al., "A 50MHz-to-1.5GHz Cross-Correlation CMOS Spectrum Analyzer for Cognitive Radio with 89dB SFDR in 1MHz RBW", In IEEE DySpan 2010, Singapore, SG, Apr. 2010, pp. 1-6.
Alink, M.S.O., et al., "A CMOS-Compatible Spectrum Analyzer for Cognitive Radio Exploiting Crosscorrelation to Improve Linearity and Noise Performance", In IEEE Transaction on Circuits and Systems—I, vol. 59, Mar. 2012, pp. 479-492.
Alink, M.S.O., et al., "Using Cross Correlation to Mitigate Analog/RF Impairments for Integrated Spectrum Analyzers", In IEEE Transaction on Microwave Theory and Techniques, vol. 61, No. 3, Mar. 2013, pp. 1327-1337.
Ammar, Y., et al., "An Ultra-Low Power Wake Up Receiver with Flip Flops Based Address Decoder", In the 12th International Multi-Conference on Systems, Signals & Devices (SSD), Sakiet Ezzit Sfax, Tunisia, Mar. 16-19, 2015, pp. 1-5.
Andrews, C. and Molnar, A., "A Passive Mixer-First Receiver With Digitally Controlled and Widely Tunable RF Interface", In IEEE Journal of Solid-State Circuits, vol. 45, No. 12, Dec. 2010, pp. 2696-2708.
Andrews, C. and Molnar, A., "A Passive-Mixer-First Receiver with Baseband-Controlled RF Impedance Matching, 6dB NF, and 27dBm Wideband IIP3", In IEEE International Solid-State Circuits Conference, Digest of Technical Papers, San Francisco, CA, US, Feb. 7-11, 2010, pp. 46-47.
Anttila, L., et al., "Circularity-Based I/Q Imbalance Compensation in Wideband Direct-Conversion Receivers", In IEEE Transactions on Vehicular Technology, vol. 57, No. 4, Jul. 2008, pp. 2099-2113.
Aparin, V., "A New Method of TX Leakage Cancelation in W/CDMA and GPS Receivers", In IEEE Proceedings of the Radio Frequency Integrated Circuits Symposium, Digest of Technical Papers, Atlanta, GA, US, Jun. 15-17, 2008, pp. 87-90.
Aparin, V., et al., "An Integrated LMS Adaptive Filter of TX Leakage for CDMA Receiver Front Ends", In IEEE Journal of Solid-State Circuits, vol. 41, No. 5, May 2006, pp. 1171-1182.
Ayazian, S. and Gharpurey, R., "Feedforward Interference Cancellation in Radio Receiver Front-ends", In IEEE Transactions in Circuits and Systems II: Express Briefs, vol. 54, No. 10, Oct. 2007, pp. 902-906.
Bagheri, R., et al., "An 800-MHz-6-GHz Software-Defined Wireless Receiver in 90-nm CMOS", In IEEE Journal of Solid-State Circuits, vol. 41, No. 12, Dec. 2006, pp. 2860-2688.
Bajor et al., "An 8-Element, 1-3GHz Direct Space-to-Information Converter for Rapid, Compressive-Sampling Direction-of-Arrival Finding Utilizing Pseudo-Random Antenna-Weight Modulation", in Proc. IEEE Radio Freq. Integr. Circuits Symp., Jun. 2018, pp. 116-119.
Bajor et al., "Theory and Design of a Direct Space-to-Information Converter for Rapid Detection of Interferer DoA", in Proc. IEEE 86th Veh. Technol. Conf., Sep. 2017, pp. 1-5.
Balankutty, A. and Kinget, P., "An Ultra-Low Voltage, Low-Noise, High Linearity 900-MHz Receiver With Digitally Calibrated In-Band Feed-Forward Interferer Cancellation in 65-nm CMOS", In IEEE Journal of Solid-State Circuits, vol. 46, No. 10, Oct. 2011, pp. 2268-2283.
Barati et al., "Directional Cell Search for Millimeter Wave Cellular Systems", in Proc. IEEE 15th Int. Workshop Signal Process. Adv. Wireless Commun., Jun. 2014, pp. 120-124.
Bardin, J. C., et al., "A 0.5-20 GHz Quadrature Downconverter", In IEEE Bipolar/BiCMOS Circuits and Technology Meeting, Monterey, CA, US, Oct. 13-15, 2008, pp. 186-189.
Bdiri, S. and Derbel, F., "A Nanowatt Wake-Up Receiver for Industrial Production Line", In the 11th International Multi-Conference on Systems, Signals & Devices, Barcelona, ES, Feb. 11-14, 2014, pp. 1-6.

(56) References Cited

OTHER PUBLICATIONS

Bdiri, S. and Derbel, F., "An Ultra-Low Power Wake-Up Receiver for Real-Time Constrained Wireless Sensor Networks", In the AMA Conferences 2015—SENSOR 2015 and IRS 2015, Nuremberg, DE, May 19-21, 2015, pp. 612-617.

Belfiori et al., "Digital Beam Forming and Compressive Sensing Based DOA Estimation in MIMO Arrays", in Proc. 8th Eur. Radar Conf., Oct. 2011, pp. 285-288.

Blaakmeer, S.C., et al., "Wideband Balun-LNA With Simultaneous Output Balancing, Noise-Canceling and Distortion-Canceling", In IEEE Journal of Solid-State Circuits, vol. 43, No. 6, Jun. 2008, pp. 1341-1350.

Borremans, J., et al. "Low-area Active-feedback Low-noise Amplifier Design in Scaled Digital CMOS", In IEEE Journal of Solid-State Circuits, vol. 43, No. 11, Nov. 2008, pp. 2422-2433.

Braun, M., et al., "Signal Detection for Cognitive Radios with Smashed Filtering", In VTC Spring 2009—IEEE 69th Vehicular Technology Conference, Barcelona, ES, Apr. 26-29, 2009, pp. 1-5.

Brown et al., "Extreme Beam Broadening Using Phase Only Pattern Synthesis", in Proc. 4th IEEE Workshop Sensor Array Multichannel Process., Jul. 2006, pp. 36-39.

Bruccoleri, F., et al., "Wide-Band CMOS Low-Noise Amplifier Exploiting Thermal Noise Canceling", In IEEE Journal of Solid-State Circuits, vol. 39, No. 2, Feb. 2004, pp. 275-282.

Candès, E., "Compressive Sampling", in Proc. Int. Congr., Aug. 2006, pp. 1433-1452.

Candes, E., et al., "Decoding by Linear Programming", In IEEE Transactions on Information Theory, vol. 51, No. 12, Dec. 2005, pp. 4203-4215.

Candes, E., et al., "Robust Uncertainty Principals: Signal Reconstruction from Highly Incomplete Frequency Information", In IEEE Transactions on Information Theory, vol. 52, No. 2, Feb. 2006, pp. 489-509.

Chen, R. and Hashemi, H., "A 0.5-to-3 GHz Software-Defined Radio Receiver using Sample Domain Signal Processing", In Proceedings of IEEE Radio Frequency Inteqrated Circuits Symposium, Seattle, WA, US, Jun. 2-4, 2013, pp. 315-318.

Chen, X., et al., "A Sub-Nyquist Rate Compressive Sensing Data Acquisition Front-End", In IEEE Journal on Emerging and Selected Topics in Circuits and Systems, vol. 2, No. 3, Sep. 2012, pp. 542-551.

Cherry, E. and Hooper, D., "The Design of Wide-Band Transistor Feedback Amplifiers", In Proceedings of the Institution of Electrical Engineers, vol. 110, No. 2, Feb. 1963, pp. 375-389.

Chi et al., "Sensitivity to Basis Mismatch in Compressed Sensing", in IEEE Trans. Signal Process., vol. 59, No. 5, May 2011, pp. 2182-2195.

Darabi, H., "A Blocker Filtering Technique for SAW-Less Wireless Receivers", In IEEE Journal of Solid-State Circuits, vol. 42, No. 12, Dec. 2007, pp. 2766-2773.

Darabi, H., et al., "Highly Integrated and Tunable RF Front Ends for Reconfigurable Multiband Transceivers: A Tutorial", In IEEE Transactions on Circuits and Systems I: Regular Papers, vol. 58, No. 9, Sep. 2011, pp. 2038-2050.

Darvishi, M., et al., "A 0.1-to-1.2GHz Tunable 6th-Order N-Path Channel-Select Filter with 0.6dB Passband Ripple and +7dBm Blocker Tolerance", In IEEE International Solid-State Circuits Conference Digest of Technical Papers, San Francisco, CA, US, Feb. 2013, pp. 172-174.

Davis, G., et al., "Adaptive Greedy Approximations", In Constructive Approximation, vol. 13, No. 1, Mar. 1997, pp. 57-98.

Dominguez-Jimenez, M.E., et al., "Analysis and Design of Multirate Synchronus Sampling Schemes for Sparse Multiband Signals", In the Proceedings of the 20th European Signal Processing Conference, Bucharest, RO, Aug. 27-31, 2012, pp. 1184-1188.

Donoho, D., "Compressive Sensing", Department of Statistics, Stanford University, Sep. 2004, pp. 1-34.

Donoho, D.L., "For Most Large Underdetermined Systems of Equations, the Minimal $1^{\wedge}1$ Norm Near Solution Approximates the Sparsest Solution", In Communications on Pure and Applied Mathematics, vol. 59, No. 7, Jul. 2006, pp. 907-934.

Durante, M.S. and Mahlknecht, S., "An Ultra-Low Power Wake-Up Receiver for Wireless Sensor Nodes", In Proceedings of the 3rd International Conference on Sensor Technologies and Applications, Athens, GR, Jun. 18-23, 2009, pp. 167-170.

Fleyer, M., et al., "Multirate Synchronus Sampling of Sparse Multiband Signals", In IEEE Transactions on Signal Processing, vol. 58, No. 3, Mar. 2010, pp. 1144-1156.

Fong, K.L., "Dual-band High-linearity Variable-gain Low-noise Amplifiers for Wireless Applications", In IEEE International Solid-State Circuits Conference Digest of Technical Papers, Feb. 1999, pp. 224-225.

Geis, A., et al., "A 0.045mm2 0.1-6GHz Reconfigurable Multi-Band, Multi-Gain LNA for SDR", In Proceedings of IEEE Radio Frequency Integrated Circuits Symposium, Anaheim, CA, US, May 23-25, 2010, pp. 123-126.

Gerstoft et al., "Multiple Snapshot Compressive Beamforming", in Proc. 49th Asilomar Conf. Signals, Syst. Comput., Nov. 2015, pp. 1774-1778.

Ghaffari et al., "Simultaneous Spatial and Frequency-Domain Filtering at the Antenna Inputs Achieving up to +10dBm Out-of-Band/ beam P1dB", in IEEE Int. Solid-State Circuits Conf. Dig. Tech. Papers, Feb. 2013, pp. 84-85.

Ghaffari, A., et al., "8-Path Tunable RF Notch Filters for Blocker Suppression", In IEEE International Solid-State Circuits Conference Digest of Technical Papers, Feb. 2012, pp. 76-78.

Ghaffari, A., et al., "Tunable High-Q N-Path Band-Pass Filters: Modeling and Verification", In IEEE Journal of Solid-State Circuits, vol. 46, No. 5, May 2011, pp. 1-29.

Ghaffari, A., et al., "Tunable N-path Notch Filters for Blocker Suppression: Modeling and Verification", In IEEE Journal of Solid-State Circuits, vol. 48, No. 6, Jun. 2013, pp. 1370-1382.

Giannini, V., et al., "A 2-mm 0.1-5 GHz Software-defined Radio Receiver in 45-nm Digital CMOS", In IEEE Journal of Solid-State Circuits, vol. 44, No. 12, Dec. 2009, pp. 3486-3498.

Giordani et al., "Initial Access in 5G mmWave Cellular Networks", in IEEE Commun. Mag., vol. 54, No. 11, Nov. 2016, pp. 40-47.

Goel, A., et al., "A 130-nm CMOS 100-Hz-6-GHz Reconfigurable Vector Signal Analyzer and Software-Defined Receiver", In IEEE Transactions on Microwave Theory and Techniques, May 2012, pp. 1-15.

Gold, R., "Optimal Binary Sequences for Spread Spectrum Mulitplexing (Correspondence)", In IEEE Transactions on Information Theory, vol. 13, Oct. 1967, pp. 619-621.

Han, H.G. and Kim, T.W., "A CMOS RF Programmable-Gain Amplifier for Digital TV With a +9-dBm IIP3 Cross-Coupled Common-Gate LNA", In IEEE Transactions on Circuits and Systems II: Express Briefs, vol. 59, No. 9, Sep. 2012, pp. 543-547.

Haque et al., "A Reconfigurable Architecture Using a Flexible LO Modulator to Unify High-Sensitivity Signal Reception and Compressed Sampling Wideband Signal Detection", in IEEE J. Solid-State Circuits, vol. 53, No. 6, Jun. 2018, pp. 1577-1591.

Haque, T., et al. "Theory and Design of a Quadrature Analog-to-Information Converter for Energy-Efficient Wideband Spectrum Sensing", In IEEE Transactions on Circuits and Systems I: Regular Papers, vol. 62, No. 2, Feb. 2015, pp. 527-535.

He, X. and Kundur, H., "A Compact SAW-less Multiband WCDMA/ GPS Receiver Front-End with Translational Loop for Input Matching", In IEEE International Solid-State Circuits Conference Digest of Technical Papers, Apr. 2011, pp. 372-374.

Hsu, C.W., et al., "A Sub-Sampling-Assisted Phase-Frequency Detector for Low-Noise PLLs With Robust Operation Under Supply Interference", In IEEE Transactions on Circuits and Systems I: Regular Papers, vol. 62, No. 1, Jan. 2015, pp. 90-99.

Hutu, F., et al., "A New Wake-Up Radio Architecture for Wireless Sensor Networks", In EURASIP Journal on Wireless Communications and Networking, vol. 1, No. 177, Dec. 2014, pp. 1-10.

Ingels, M., et al., "A 5mm2 40nm LP CMOS 0.1-to-3GHz Multistandard Transceiver", In IEEE Internation Solid-State Circuits Conference, San Francisco, CA, US, Feb. 7-11, 2010, pp. 458-459.

(56) References Cited

OTHER PUBLICATIONS

International Preliminary Report on Patentability dated Apr. 23, 2019 in International Patent Application No. PCT/US2017/057923, pp. 1-6.
International Preliminary Report on Patentability of the International Searching Authority dated Mar. 14, 2017 in International Patent Application No. PCT/US2015/050058, pp. 1-10.
International Preliminary Report on Patentability of the International Searching Authority dated Aug. 9, 2016 in International Patent Application No. PCT/US2015/015036, pp. 1-5.
International Search Report and Written Opinion of the International Searching Authority dated Jan. 4, 2018 in International Patent Application No. PCT/US2017/057923, pp. 1-38.
International Search Report and Written Opinion of the International Searching Authority dated Oct. 23, 2015 in International Patent Application No. PCT/US2015/015036, pp. 1-12.
International Search Report and Written Opinion of the International Searching Authority dated Dec. 22, 2015 in International Patent Application No. PCT/US2015/50058, pp. 1-11.
Izquierdo, C., et al., "Reconfigurable Wide-band Receiver with Positive Feed-back Translational Loop", In Proceedings of IEEE Radio Frequency Integrated Circuits Symposium, Baltimore, MD, US, Jun. 5-7, 2011, pp. 1-4.
Izquierdo, C., et al., "Wide-band Receiver Architecture with Flexible Blocker Filtering Techniques", In Proceedings of IEEE International Conference on Electronics, Circuits, and Systems, Athens, GR, Dec. 12-15, 2010, pp. 894-897.
Kaltiokallio, M., et al., "Wideband 2 to 6 GHz RF Front-end with Blocker Filtering", In IEEE Journal of Solid-State Circuits, vol. 47, No. 7, Jul. 2012, pp. 1636-1645.
Kirolos, S., et al., "Analog-to-Information Conversion via Random Demodulation", In IEEE Dallas/CAS Workshop on Design, Applications, Integration and Software, Richardson, TX, US, Oct. 29-30, 2006, pp. 71-74.
Kitsunezuka, M., et al., "A 30-MHz-2.4-GHz CMOS Receiver With Integrated RF Filter and Dynamic-Range-Scalable Energy Detector for Cognitive Radio Systems", In IEEE Journal of Solid-State Circuits, vol. 47, No. 5, May 2012, pp. 1084-1093.
Kitsunezuka, M., et al., "A 5-9-mW, 0.2-2.5-GHz CMOS Low-IF Receiver for Spectrum-Sensing Cognitive Radio Sensor Networks", In IEEE Radio Frequency Integrated Circuits Symposium, Honolulu, HI, US, Jun. 4-6, 2013, pp. 319-322.
Kohno et al,. "Array Antenna Beamforming based on Estimation of Arrival Angles using DFT on Spatial Domain", in Proc. IEEE Int. Symp. Pers., Indoor Mobile Radio Commun., Sep. 1991, pp. 38-43.
Laska, J.N., et al., "Theory and Implementation of an Analog-to-Information Converter Using Random Demodulation", In IEEE International Symposium on Circuits and Systems, New Orleans, LA, US, May 27-30, 2007, pp. 1959-1962.
Le, T.N., et al., "Ultra Low-Power Asynchronous MAC Protocol using Wake-Up Radio for Energy Neutral WSN", In Proceedings of the 1st International Workshop on Energy Neutral Sensing Systems, Article 10, Nov. 14, 2013, pp. 1-6.
Marzi et al., "Compressive Channel Estimation and Tracking for Large Arrays in mm-Wave Picocells", in IEEE J. Sel. Topics Signal Process., vol. 10, No. 3, Apr. 2016, pp. 514-527.
McHenry, M.A., et al., "Spectrum Occupancy Measurements", NeTs-ProWIN: Characterization and Impacton Network Performance, Shared Spectrum Company, Dec. 20, 2005, pp. 1-58.
Miar, Y., et al., "A Novel Reduced Power Compressive Sensing Technique for Wideband Cognitive Radio", In EURASIP Journal on Wireless Communications and Networking, Dec. 2012, pp. 1-12.
Mirzaei, A., et al., "Analysis and Optimization of Current-Driven Passive Mixers in Narrowband Direct-Conversion Receivers", In IEEE Journal of Solid-State Circuits, vol. 44, No. 10, Oct. 2009, pp. 2678-2688.
Mirzaei, A., et al., "A 65 nm CMOS Quad-band SAW-less Receiver SoC for GSM/GPRS/EDGE", In IEEE Journal of Solid-State Circuits, vol. 46, No. 4, Apr. 2011, pp. 950-964.
Mishali, M., et al., "Blind Multiband Signal Reconstruction: Compressed Sensing for Analog Signals", In IEEE Transactions on Signal Processing, vol. 57, No. 3, Mar. 2009, pp. 993-1009.
Mishali, M., et al., "From Theory to Practice: Sub-Nyqust Sampling of Sparse Wideband Analog Signals", In IEEE Journal of Selected Topics in Signal Processing, vol. 4, No. 2, Apr. 2010, pp. 375-391.
Mishali, M., et al., "Wideband Spectrum Sensing at Sub-Nyquist Rates", In IEEE Signal Processing Magazine, vol. 28, No. 4, Jul. 2011, pp. 102-135.
Mitola III, J., "Cognitive Radio For Flexible Mobile Mulitmedia Communications", In Mobile Networks and Applications, vol. 6, No. 5, Sep. 2001, pp. 435-441.
Murmann, B., "ADC Performance Survey 1997-2015", last updated Jul. 2016, available at: http://web.stanford.edu/~murmann/adcsurvey.html, pp. 1-4.
Murphy, D., et al., "A Blocker-Tolerant Wideband Noise-Cancelling Receiver with a 2dB Noise Figure", In IEEE International Solid-State Circuits Conference, San Francisco, CA, US, Feb. 19-23, 2012, pp. 74-76.
Murphy, D., et al., "A Blocker-Tolerant, Noise-Cancelling Receiver Suitable for Wideband Wireless Applications", In IEEE Journal of Solid-State Circuits, vol. 47, No. 12, Dec. 2012, pp. 2943-2963.
Notice of Allowance dated Jan. 3, 2020 in U.S. Appl. No. 15/676,610, pp. 1-40.
Notice of Allowance dated May 8, 2017 in U.S. Appl. No. 15/285,474, pp. 1-47.
Notice of Allowance dated Jul. 18, 2018 in U.S. Appl. No. 15/510,910, pp. 1-23.
Notice of Allowance dated Dec. 13, 2017 in U.S. Appl. No. 15/117,662, pp. 1-13.
Office Action dated May 11, 2018 in U.S. Appl. No. 15/676,610, pp. 1-29.
Office Action dated May 19, 2017 in U.S. Appl. No. 15/117,662, pp. 1-18.
Office Action dated Aug. 2, 2021 in U.S. Appl. No. 16/331,086, pp. 2-12.
Office Action dated Dec. 13, 2018 in U.S. Appl. No. 15/676,610, pp. 1-23.
Office Action dated Dec. 14, 2017 in U.S. Appl. No. 15/510,910, pp. 1-26.
Office Action dated Dec. 16, 2016 in U.S. Appl. No. 15/285,474, pp. 1-29.
Oller, J., et al., "Design, Development, and Performance Evaluation of a Low-Cost, Low-Power Wake-Up Radio System for Wireless Sensor Networks", In ACM Transactions on Sensor Networks, vol. 10, No. 1, Article 11, Nov. 2013, pp. 1-24.
Pandey, J., and Otis, B.R., "A Sub-100 µW MICS/ISm Band Transmitter Based on Injection-Locking and Frequency Multiplication", In IEEE Journal of Solid-State Circuits, vol. 46, No. 5, May 2011, pp. 1049-1058.
Park, J., et al., "A Fully Integrated UHF-Band CMOS Receiver With Multi-Resolution Spectrum Sensing Functionality for IEEE 802.22 Cognitive Radio Applications", In IEEE Journal of Solid-State Circuits, vol. 44, No. 1, Jan. 2009, pp. 258-268.
Park, J.W. and Razavi, B., "A 20 mW GSM/WCDMA Receiver with RF Channel Selection", In Proceedings of IEEE International Solid-State Circuits Conference, San Francisco, CA, US, Feb. 9-14, 2014, pp. 356-358.
Pickholtz, R.L., et al., "Theory of Spread-Spectrum Communications—A Tutorial", In IEEE Transactions on Commincations, vol. 30, No. 5, May 1982, pp. 855-884.
Pletcher, N.M., "Ultra-Low Power Wake-Up Receivers for Wireless Sensor Networks", Technical Report, Department of Electrical Engineering and Computer Sciences, Univeristy of California, Berkeley, CA, US, May 20, 2008, pp. 1-164.
Pletcher, N.M., et al., "A 52 µW Wake-Up Receiver with 72-dBm Sensitivity using an Uncertain-IF Architecture", In the IEEE Journal of Solid-State Circuits, vol. 44, No. 1, Jan. 2009, pp. 269-280.
Pollin, S., et al., "Digital and Analog Solution for Low-power Multi-band Sensing", In IEEE DySPAN 2010, Singapore, SG, Apr. 6-9, 2010, pp. pp. 1-2.

(56) References Cited

OTHER PUBLICATIONS

Polo, Y.L., et al., "Compressive Wide-Band Spectrum Sensing", In IEEE International Conference on Acoustics, Speech and Signal Processing, Taipei, TW, Apr. 19-24, 2009, pp. 2337-2340.
Rasekh et al., "Effect of Out-of-Band Blockers on the Required Linearity, Phase Noise, and Harmonic Rejection of SDR Receivers without Input SAW Filter", in IEEE Trans. Microw. Theory Techn., vol. 66, No. 11, Nov. 2018, pp. 4913-4926.
Razavi, B., "Design Considerations for Direct-Conversion Receivers", In IEEE Transactions on Circuits and Systems, vol. 44, No. 6, Jun. 1997, pp. 428-435.
Roberts, N.E. and Wentzloff, D.D., "A 98nW Wake-Up Radio for Wireless Body Area Networks", In the IEEE Radio Frequency Integrated Circuits Symposium, Montreal, Canada, Jun. 17-19, 2012, pp. 373-376.
Roberts, N.E., et al., "A 236nW-56.5dBm-Sensitivity Bluetooth Low-Energy Wakeup Receiver with Energy Harvesting in 65nm CMOS", In Proceedings of the International Solid-State Circuits Conference, San Francisco, CA, US, Feb. 11-15, 2016, pp. 450-451.
Rossi et al., "Spatial Compressive Sensing for MIMO Radar", in IEEE Trans. Signal Process., vol. 62, No. 2, Jan. 2014, pp. 419-430.
Roy et al., "Estimation of Signal Parameters via Rotational Invariance Techniques—ESPRIT", in Proc. IEEE Mil. Commun. Conf., Commun.-Comput., Teamed, vol. 3, Oct. 1986, pp. 41.6.1-41.6.5.
S. Hur et al., "Multilevel Millimeter Wave Beamforming for Wireless Backhaul", in Proc. IEEE GLOBECOM Workshops, Dec. 2011, pp. 253-257.
Salazar, C., et al., "A 2.4 GHz Interferer-Resilient Wake-Up Receiver Using a Dual-IF Multi-Stage N-Path Architecture", In the IEEE Journal of Solid-State Physics, vol. 51, No. 9, Sep. 2016, pp. 2091-2110.
Schmidt et al., "Multiple Emitter Location and Signal Parameter Estimation", in IEEE Trans. Antennas Propag., vol. AP-34, No. 3, Mar. 1986, pp. 276-280.
Selva, J., "Regularized Sampling of Multiband Signals", In IEEE Transactions on Signal Processing, vol. 58, No. 11, Nov. 2010, pp. 5624-5638.
Sen, S., et al., "A Power-Scalable Channel-Adaptive Wireless Receiver Based on Built-In Orthogonally Tunable LNA", In Transactions on Circuits and Systems I: Regular Papers, vol. 59, No. 5, May 2012, pp. 946-957.
Shaw et al., "Angle of Arrival Detection Using Compressive Sensing", in Proc. 18th Eur. Signal Process. Conf., Aug. 2010, pp. 1424-1428.
Soer et al., "Beamformer with Constant-Gm Vector Modulators and its Spatial Intermodulation Distortion", in IEEE J. Solid-State Circuits, vol. 52, No. 3, Mar. 2017, pp. 735-746.
Soer et al., "Spatial Interferer Rejection in a Four-Element Beamforming Receiver Front-End with a Switched-Capacitor Vector Modulator", in IEEE J. Solid-State Circuits, vol. 46, No. 12, Dec. 2011, pp. 2933-2942.
Soer, M.C.M., et al., "0.2-to-2.0GHz 65nm CMOS Receiver Without LNA Achieving >11dBm IIP3 and <6.5 dB NF", In IEEE International Solid-State Circuits Conference Digest of Technical Papers, Feb. 12, 2009, pp. 222-223.
Steyaert, M. and Craninckx, J., "1.1 GHz Oscillator Using Bondwire Inductance", In Electronics Letters, vol. 30, No. 3, Feb. 3, 1994, pp. 244-245.
Stoopman, M., et al., "Co-Design of a CMOS Rectifier and Small Loop Antenna for Highly Sensitive RF Energy Harvesters", In the IEEE Journal of Solid-State Circuits, vol. 49, No. 3, Mar. 2014, pp. 622-634.
Sturm, J., et al., "A 65nm CMOS Wide-band LNA with Continuously Tunable Gain from 0dB to 24dB", In Proceedings of IEEE International Symposium on Circuits and Systems (ISCAS), Beijing, CN, May 19-23, 2013, pp. 733-736.
Tian, Z. and Giannakis, G.B., "Compressed Sensing for Wideband Cognitive Radios", In IEEE International Conference on Acoustics, Speech and Signal Processing, Honolulu, HI, US, Article 4, Apr. 15-20, 2007, pp. 1357-1360.
Tropp et al., "Signal Recovery from Random Measurements via Orthogonal Matching Pursuit," in IEEE Trans. Inf. Theory, vol. 53, No. 12, Dec. 2007, pp. 4655-4666.
Tropp, J.A., et al., "Beyond Nyquist: Efficient Sampling of Sparse Bandlimited Signals", In IEEE Transactions on Information Theory, vol. 56, Jan. 2010, pp. 520-544.
Umbdenstock, E., et al., "Wake-Up-Receiver in Energy Efficient Wireless Sensor Networks for Security Applications", In Proceedings of the 7th Edition of the Interdisciplinary Workshop on Global Security, Jan. 22-23, 2013, pp. 1-4.
Van Veen et al., "Beamforming: A Versatile Approach to Spatial Filtering," in IEEE ASSP Mag., vol. 5, No. 2, Apr. 1988, pp. 4-24.
Viitala, O., et al., "A Wideband Under-Sampling Blocker Detector with a 0.7-2.7GHz Mixer First Receiver", In the Proceedings of the 2015 Radio Frequency Inegrated Circuits Symposium, Phoenix, AZ, US, May 2015, pp. 1-4.
Wang et al., "Direction Estimation Using Compressive Sampling Array Processing", in Proc. IEEE/SP 15th Workshop Statist. Signal Process., Aug.-Sep. 2009, pp. 626-629.
Wang, Y., et al., "A Two-Step Compressed Spectrum Sensing Scheme for Wideband Cognitive Radios", In IEEE Global Telecommunications Conference, Miami, FL, US, Dec. 6-10, 2010, pp. 1-5.
Wang, Y.H., et al., "A 2.1 to 6 GHz Tunable-band LNA With Adaptive Frequency Responses by Transistor Size Scaling", In IEEE Microwave and Wireless Components Letters, vol. 20, No. 6, Jun. 2010, pp. 346-348.
Werth, T., et al., "Active Feedback Interference Cancellation in RF Receiver Front-End", In Proceedings of IEEE Radio Frequency Integrated Circuits Symposium, Boston, MA, US, Jun. 7-9, 2009, pp. 379-382.
Werth, T., et al., "An Active Feedback Interference Cancellation Technique for Blocker Filtering in RF Receiver Front-Ends", In IEEE Journal of Solid-State Circuits, vol. 45, No. 5, May 2010, pp. 989-997.
Wohlmuth, H.D. and Kehrer, D., "A Low Power 13-GB/s $2^{\wedge}7$-1 Pseudo Random Bit Sequence Generator IC in 120 nm Bulk CMOS", In Proceedings of the 17th Symposium on Integrated Circuits and System Design, Pernambuco, BR, Sep. 7-11, 2004, pp. 233-236.
Xenaki et al., "Sparse DOA Estimation with Polynomial Rooting", in Proc. 3rd Int. Workshop Compressed Sensing Theory Appl. Radar, Sonar Remote Sensing, Jun. 2015, pp. 104-108.
Yang, X., et al., "Random Circulant Orthogonal Matrix Based Analog Compressed Sensing", In IEEE Global Communications Conference, Anaheim, CA, US, Dec. 3-7, 2012, pp. 3605-3609.
Yazicigil et al., "How to Make Analog-to-Information Converters Work in Dynamic Spectrum Environments with Changing Sparsity Conditions", in IEEE Trans. Circuits Syst. I, Reg. Papers, vol. 65, No. 6, Jun. 2018, pp. 1775-1784.
Yazicigil et al., "Wideband Rapid Interferer Detector Exploiting Compressed Sampling with a Quadrature Analog-to-Information Converter", in IEEE J. Solid-State Circuits, vol. 50, No. 12, Dec. 2015, pp. 3047-3064.
Yazicigil, R.T., et al., "A 2.7-to-3.7GHz Rapid Interferer Detector Exploiting Compressed Sampling with a Quadrature Analog-to-Information Converter", In IEEE Solid-State Circuits Conference, San Francisco, CA, US, Feb. 2015, pp. 1-3.
Ye, D., et al., "An Ultra-Low-Power Receiver Using Transmitted-Reference and Shifted Limiters for In-Band Interference Resilience", In the Proceedings of the IEEE Solid-State Circuits Conference, San Francisco, CA, US, Jan.-Feb. 2016, pp. 438-439.
Yoo, J., et al., "A 100MHz-2GHz 12.5x sub-Byquist Rate Receiver in 90nm CMOS", In IEEE Radio Frequency Integrated Circuits Symposium, Montreal, Canada, Jun. 17-19, 2012, pp. 31-34.
Youssef, S., et al., "Active Feedback Receiver with Integrated Tunable RF Channel Selectivity, Distortion Cancelling, 48dB Stopband Rejection and >+12Bm Wideband IIP3, Occupying 0.06mm2 in 65nm CMOS", In Proceedings of IEEE ISSCC, San Francisco, CA, US, Feb. 19-23, 2012, pp. 166-168.
Yu, S.A. and Kinget, P., "A 0.042-mm2 Fully Integrated Analog PLL with Stacked Capacitor-Inductor in 45nm CMOS", In the

(56) References Cited

OTHER PUBLICATIONS

Proceedings of the European Solid-State Circuits Conference, Edinburgh, UK, Sep. 2008, pp. 94-97.

Yu, Z., et al., "Mixed-Signal Parallel Compressed Sensing and Reception for Cognitive Radio", In IEEE International Conference on Acoustics, Speech and Signal Processing, Las Vegas, NV, US, Mar. 31-Apr. 4, 2008, pp. 3861-3864.

Zhang et al., "A 0.1-to-3.1GHz 4-Element MIMO Receiver Array Supporting Analog/RF Arbitrary Spatial Filtering", in ISSCC, Feb. 2017, pp. 410-411.

Zhang et al., "9.2 A Scalable 0.1-to-1.7GHz Spatio-Spectral-Filtering 4-Element MIMO Receiver Array With Spatial Notch Suppression Enabling Digital Beamforming", in IEEE Int. Solid-State Circuits Conf. Tech. Dig. Papers, Jan./Feb. 2016, pp. 166-167.

Zhang et al., "Arbitrary Analog/RF Spatial Filtering for Digital MIMO Receiver Arrays," IEEE J. Solid-State Circuits, vol. 52, No. 12, Dec. 2017, pp. 3392-3404.

Zhang, H. and Sanchez-Sinencio, E., "Linearization Techniques for CMOS Low Noise Amplifiers: A Tutorial", In IEEE Transactions on Circuits and Systems I: Regular Papers, vol. 58, No. 1, Jan. 2011, pp. 22-36.

Zhang, T., "Sparse Recovery with Orthogonal Matching Pursuit Under Rip", In IEEE Transactions on Information Theory, vol. 57, No. 9, Sep. 2011, pp. 6215-6221.

Zhou, W., et al., "Using Capacitive Cross-coupling Technique in RF Low Noise Amplifiers and Down-conversion Mixer Design", In Proceedings of the European Solid-State Circuits Conference, Stockholm, SE, Sep. 19-21, 2000, pp. 77-80.

\* cited by examiner

CIRCUITS AND METHODS FOR USING COMPRESSIVE SAMPLING TO DETECT DIRECTION OF ARRIVAL OF A SIGNAL OF INTEREST

CROSS REFERENCE TO RELATED APPLICATION

This application claims the benefit of U.S. Provisional Patent Application No. 62/674,930, filed May 22, 2018, which is hereby incorporated by reference herein in its entirety.

BACKGROUND

For a variety of reasons, it is desirable for a wireless receiver to be able to determine the direction of arrival of a wireless signal of interest. For example, it may be desirable to determine the direction of arrival of an interferer so that the interferer can be suppressed by blocking signals from that direction. As another example, it may be desirable to determine the direction of arrival of a desired signal so that signals from other directions can be suppressed. As yet another example, it may be desirable to determine the direction of arrival of a signal so that the bearing of the source of that signal can be estimated.

Current mechanisms for determining the direction of arrival are slow and require significant power.

Accordingly, new mechanisms for determining the direction of arrival of a signal of interest are desirable.

SUMMARY

In accordance with some embodiments, circuits and methods for using compressive sampling to detect direction of arrival of a signal of interest are provided. In some embodiments, circuits for using compressive sampling to detect direction of arrival of a signal of interest are provided, the systems comprising: a plurality of receiver paths, each comprising: an antenna configured to receive the signal of interest and produce a received signal; and a modulator configured to receive a modulator input signal based on the received signal produced by the antenna in the path, to modulate the modulator input signal at multiple points in time based on different ones of a plurality of pseudo-random numbers, and to produce a plurality of modulated output signals in response to the modulating of the modulator input signal at the multiple points in time; a summer configured to sum across the plurality of receiver paths the one of the plurality of modulated output signals produced by each of the plurality of receiver paths for each of the multiple points in time, to produce a plurality of sum signals each corresponding to one of the multiple points in time; and a hardware processor configured to receive the plurality of sum signals, and to perform a compressed sensing recovery algorithm to recover the direction of arrival of the signal of interest.

In some embodiments, methods for using compressive sampling to detect direction of arrival of a signal of interest are provided, the methods comprising: in each of a plurality of receiver paths, receiving the signal of interest and producing a received signal using an antenna; and using a modulator to: receive a modulator input signal based on the received signal produced by the antenna in the path; modulate the modulator input signal at multiple points in time based on different ones of a plurality of pseudo-random numbers; and produce a plurality of modulated output signals in response to the modulating of the modulator input signal at the multiple points in time; using a summer, summing across the plurality of receiver paths the one of the plurality of modulated output signals produced by each of the plurality of receiver paths for each of the multiple points in time, to produce a plurality of sum signals each corresponding to one of the multiple points in time; and performing a compressed sensing recovery algorithm to recover the direction of arrival of the signal of interest.

DETAILED DESCRIPTION

In accordance with some embodiments, mechanisms, which can include circuits and methods, for using compressive sampling (CS) (described below) (compressive sampling may also be referred to as compressive sensing, compressed sensing, sparse sampling, and compressed sampling) to detect a direction of arrival (DoA) of a signal of interest (SoI) are provided. Using these mechanisms, the DoA of any suitable SoI can be determined in some embodiments. For example, in some embodiments, the DoA of an interferer (i.e., a signal that interferes with the reception of a desired signal) at a receiver can be determined. Once the direction of the interferer is determined, the mechanisms can then suppress signals from that direction and receive a less powerful, but desired signal from another direction. As another example, in some embodiments, the DoA of a desired signal can be determined, and that determination can be used for any suitable purpose, such as knowing the direction from which the signal is coming, to enhance the reception of that signal (such as by blocking signals coming from other directions), and/or for any other suitable purpose.

In accordance with some embodiments, a direct space-to-information converter (DSIC) that unifies a delay-and-sum (or phase-shift-and-sum) conventional beam forming (CBF) (described below) mechanism with CS-DoA finding mechanism into a single architecture is provided. In some embodiments, the DSIC is able to take CS measurements in a time-segmented manner eliminating the need for additional receivers to implement CS beyond those already needed for a CBF mechanism. In some embodiments, the DSIC can operate in at least two modes: a CBF mode in which it functions as a CBF mechanism; and a CS-DoA mode in which it performs CS DoA scans. The number of CS measurements is flexible and can be varied dynamically without the need to modify the DSIC architecture assuming the SoI remains stationary over the measurement timeframe. In addition, the DSIC is able to perform DoA scans over the entire FoV using only a single bit of resolution in its vector modulators (VMs).

Figure 1:
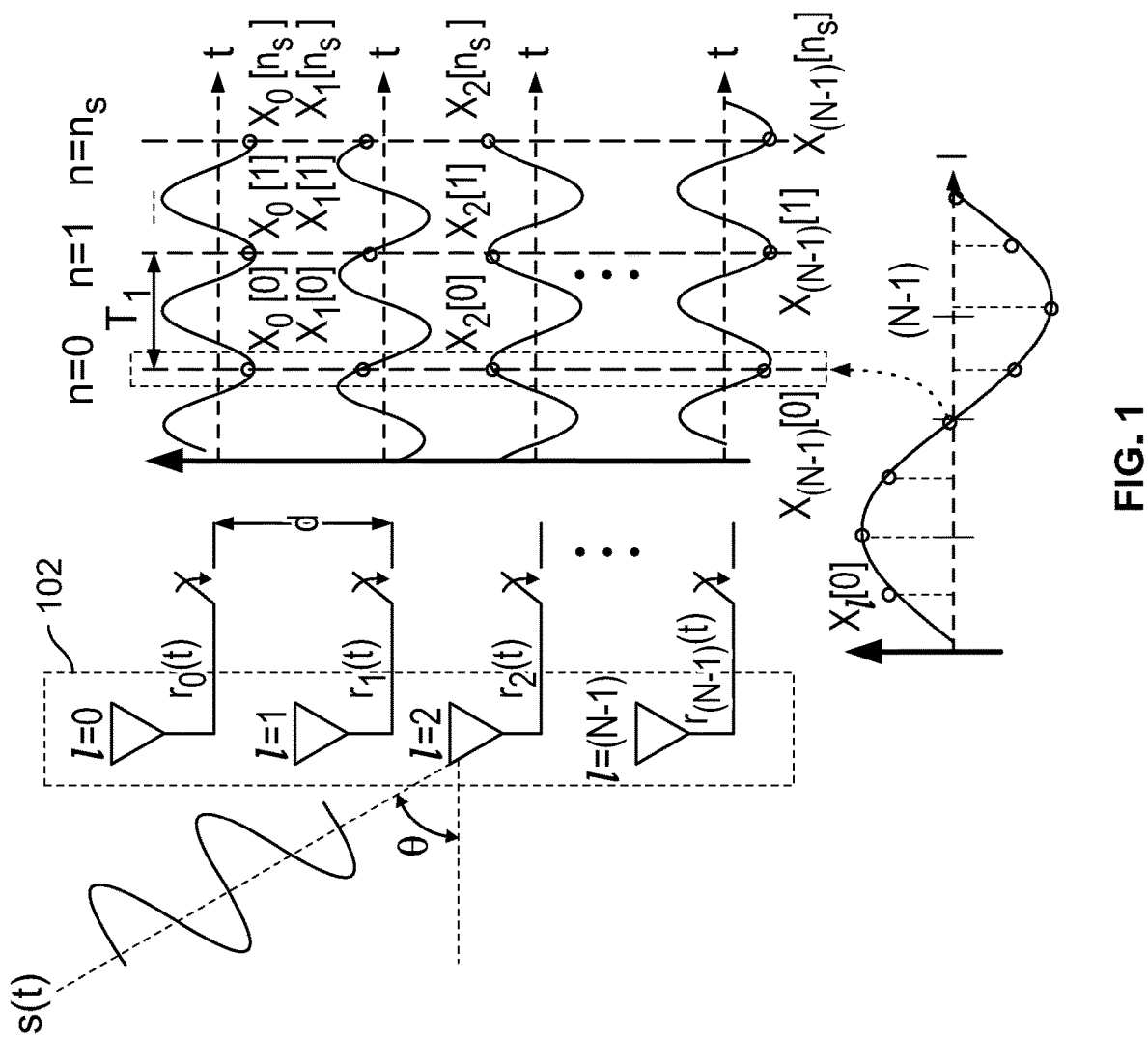
FIG. 1 illustrates an example of a signal being received at a uniform linear array of antennas in accordance with some embodiments.

Turning to FIG. 1, an illustration of how an SoI s(t) is received by a uniform linear array (ULA) 102 of antennas in accordance with some embodiments is shown. As illustrated, for an SoI s(t) located in the far field and at an angle θ from the centerline of ULA 102 with N equally spaced antennas, there will be N time delayed copies rt(t) (where I∈[0, N−1] is the antenna index) of the incident signal s(t) at each of the receiver's antennas. The nth sample of the received signal at the lth element with inter-element propagation delay Δt=(d/$f_c$)sin(θ) sampled at a rate 1/T is:

$$r_l(nT_s) = s(nT_s - l\Delta t)e^{-j2\pi f_c l \Delta t} \quad (1)$$

where $f_c$ is the carrier frequency, λ is the wavelength, and d is the distance between antenna elements normalized to X. In some embodiments, d=(λ/2).

If the sampling period 7T is much greater than the time delays Δt between each element (i.e., $\Delta t \ll T_s$), and if the signal s(t) is narrowband, equation (1) can be approximated as:

$$r_l(nT_s) = s(nT_s)e^{-j2\pi l d \sin(\theta)}. \quad (2)$$

A spatial signal across the antenna elements, represented by N×1 column vector x, can be constructed for a given time sample n. The phase progression of the signal x[n] at a given time sample n across the antenna elements can be represented by vector a(θ), defined as:

$$x[n] = s[n]e^{-j2\pi l d \sin(\theta)} = s[n]a(\theta) \quad (3a)$$

$$a(\theta) = [a_0(\theta), a_1(\theta), a_l(\theta) \ldots a_{(N-1)}(\theta)]^T. \quad (3b)$$

Assuming K signals $s_q(t)$ and additive noise at each element, represented with vector v(t), equation (3a) can be written as $$x[n] = \sum_{q=1}^{K} a(\theta_q)s_q[n] + v[n]. \quad (4)$$

The spatial frequency ρ of the phase progression of signal x[n] is $$\rho = \frac{\sin(\theta)}{\lambda}. \quad (5)$$

The spatial frequency ρ increases as the plane wave from s(t) arrives at progressively larger angles. The spectrum of x[n] contains the DoA's of all signals incident on the array and can be referred to as the spatial or angular spectrum.

Figure 2:
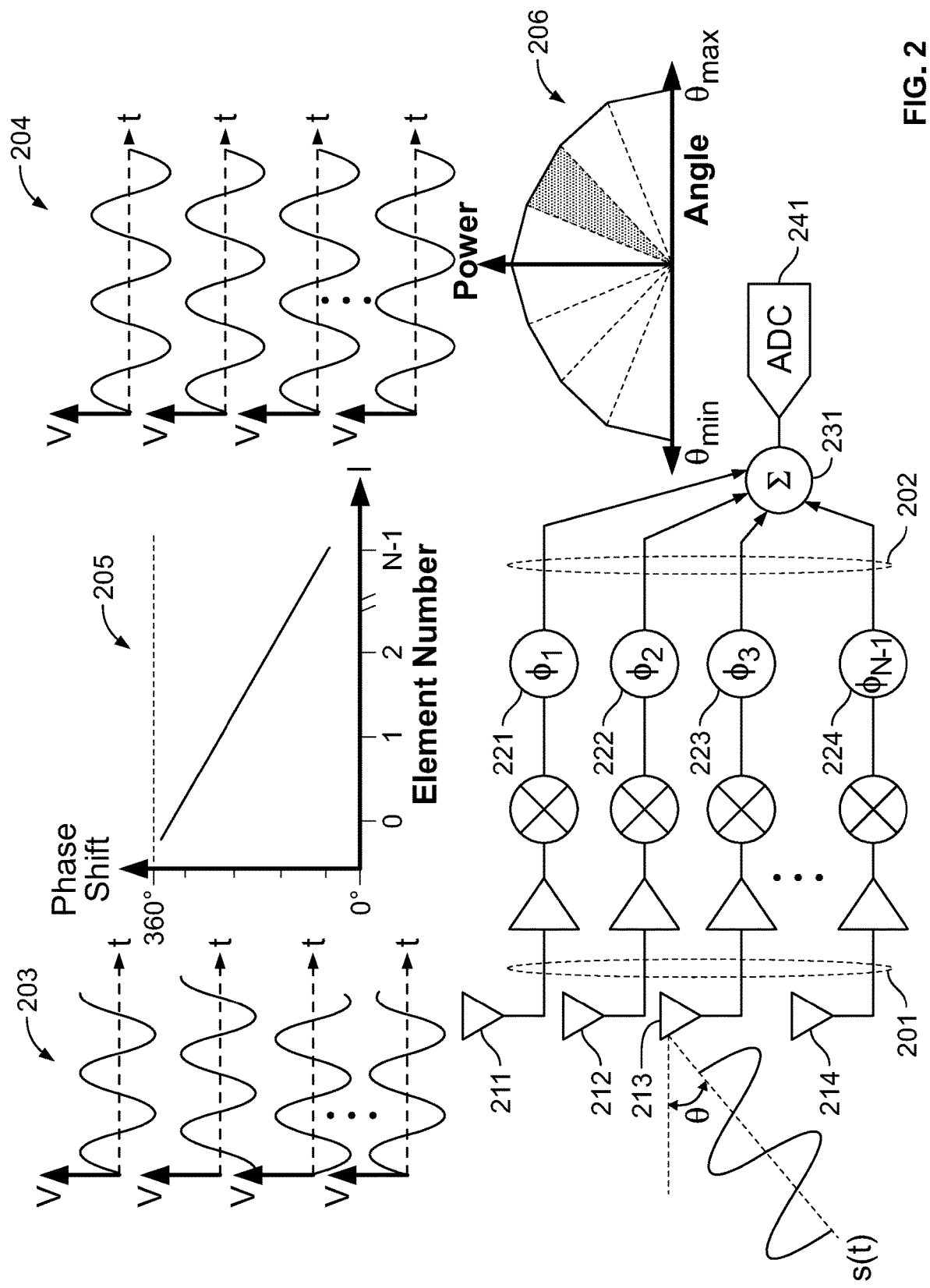
FIG. 2 illustrates an example of the direction of arrival of a signal of interest being detected using conventional beam forming in accordance with some embodiments.

In accordance with some embodiments, as illustrated in FIG. 2, a conventional beam forming (CBF) mechanism can use time-delay units or phase shifters 221, 222, 223, and 224 and a summer 231 to coherently sum the antenna paths from antennas 211, 212, 213, and 214, respectively, in effect steering the response of the uniform linear array containing antennas 211, 212, 213, and 214. If phase shifters are used, the vector of phase shift weights w across the antenna elements for a particular θ can be given by:

$$w = \frac{1}{N}[1, e^{-j\beta}, e^{-j2\beta} \ldots e^{-j(N-1)\beta}]^T \quad (6)$$

where β=2πd sin(θ). The output of the CBF mechanism after summing all paths at summer 231 is y[n] and its power q for a given weight vector w and x is:

$$y[n] = \sum_{l=0}^{N-1} w_l^H x_l[n] \quad (7)$$

$$\eta(\theta) = \frac{1}{n_s}\sum_{1}^{n_s}|y[n]|^2. \quad (8)$$

In some embodiments, steering the array includes changing the weight vector w for a desired sector angle θ and sampling the output power using an analog-to-digital converter (ADC) 241. This results in the angular spectrum as shown in equation (8).

In some embodiments, a CBF mechanism can be configured to scan all possible directions to determine the DoA of all possible signals. For a given signal s(t), at points 201, x[n] 203 is shown across antenna elements 211, 212, 213, and 214. As can be seen, the received signals in x[n] 203 are out of phase based on the time of arrival of signal s(t) at each antenna. During each step of scanning all possible directions, the phase shifts across elements $\phi_1$ 221, $\phi_2$ 222, $\phi_3$ 223, . . . , $\phi_{N-1}$ 224 can be configured to correspond to a different angle and have a linear phase relationship as shown in equation (6) and graph 205. When the phase shifts correspond to the angle θ of s(t), the signals 204 at points 202 will be aligned (or almost aligned). This will result in the combined signal output by summer 231 being maximum. Thus, after steering the array to each of the angles shown in graph 206 and measuring the power at the output of summer 231 for each of the angles, the angle with the largest power measurement can be selected as the DoA for the signal s(t).

In some embodiments, the scan time per DoA angle for the CBF mechanism can be $t_{detect} = t_s n_s$ where $n_s$ is the number of samples used by ADC 241, and $t_s$ is the sampling period. The total scan time for all N unique DoAs is $t_{scan} = N \cdot t_{detect}$. Therefore, the total energy consumption of a CBF mechanism is as follows, where $P_{ant}$ is the power consumption for each antenna path:

$$E_{CBF} = N^2 t_{detect} P_{ant}. \tag{9}$$

Swept CBF scanning as described above suffers from an inherent tradeoff between the number of antenna elements and scan time. That is, when there are more antennas, it takes longer to scan all of the DoAs provided by those antennas. Moreover, for swept CBF scanners with constant sensitivity, the energy consumption for a complete spatial scan scales quadratically with the number of antennas since there are N antennas and N possible DoAs.

Figure 3:
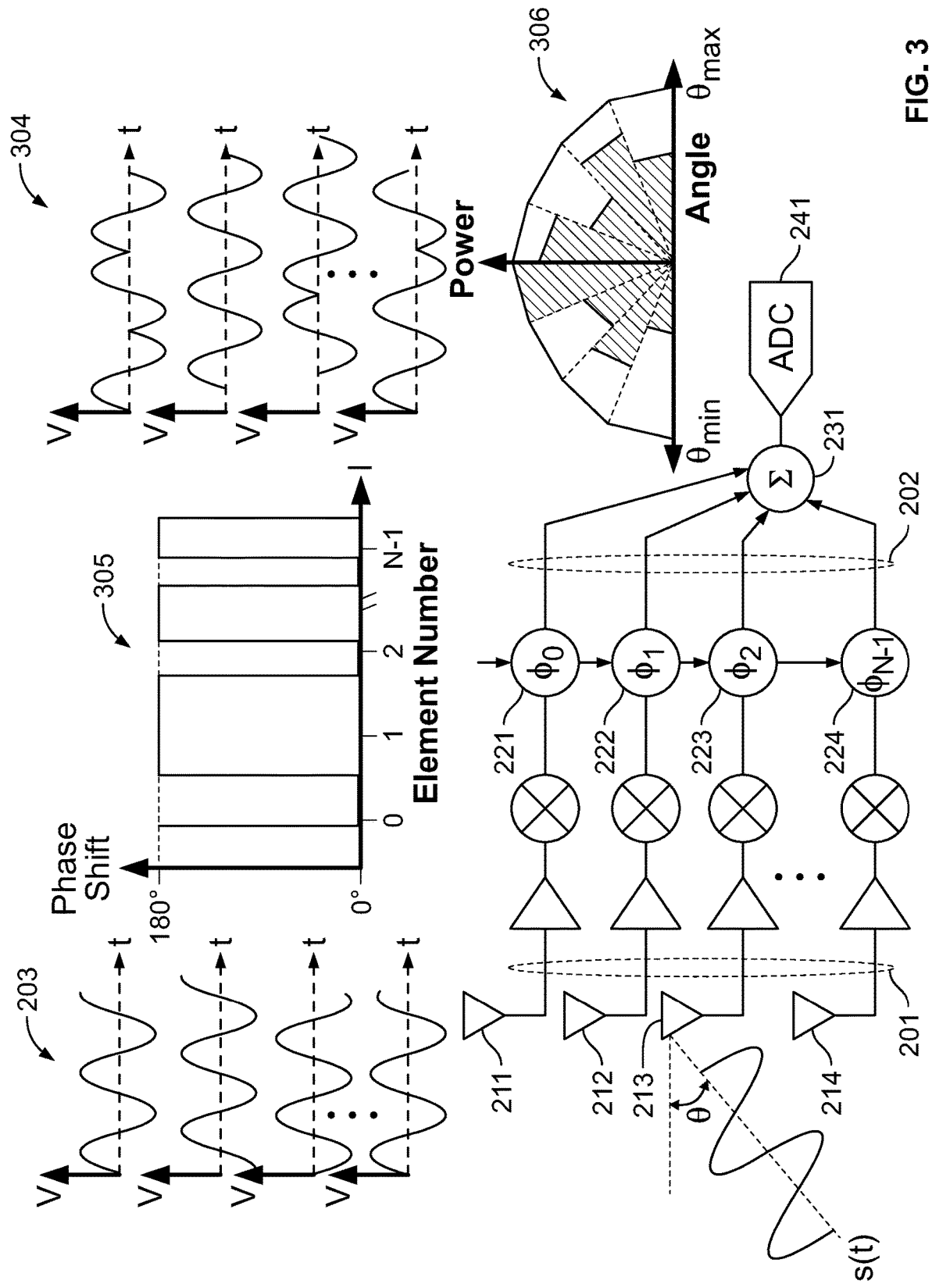
FIG. 3 illustrates an example of the direction of arrival of a signal of interest being detected using compressive sampling in accordance with some embodiments.

In accordance with some embodiments, DoA of a signal can additionally or alternatively be detected using compressive sampling (CS) as illustrated in FIG. 3. This process can be referred to as CS-DoA. In some embodiments, for a vector $x \in C^N$, where $x = \Psi X$, $\Psi$ is the N×N dictionary matrix, X is an N×1 vector with K×N non-zero entries, and K is the number of signals, the angular spectrum X can be recovered using m linear projections onto an m×N sensing matrix $\Phi$ that is incoherent with $\Psi$. A system equation for CS-DoA can be written as $y = \Phi \Psi X$ in some embodiments. The number m of linear projections required to perform compressive sampling can be determined as follows in some embodiments:

$$m = K C_o \log\left(\frac{N}{K}\right) \text{ where } 2 \leq C_0 \leq 4. \tag{10}$$

Recovery of X can be performed using any suitable algorithm in some embodiments. For example, in some embodiments, orthogonal matching pursuit (OMP) can be used to recover X. Other sparse approximation algorithms, such as matching pursuit (MP) or basis pursuit (BP), can also be used in some embodiments.

The matrix $\Psi$ rows are equivalent to the conjugate transpose w, each corresponding to a different angle θ, and X is the spectrum of the signal vector across elements, where each element of X corresponds to incident signal power at a particular angle θ.

In some embodiments, CS-DoA can calculate the DoAs of x using fewer scans and, hence, less time, than CBF (as dictated by equation (8)) by using m random mixtures of antenna branches called composite antenna patterns.

In some embodiments, CS-DoA senses signals from all directions by pseudo-random number (PN) modulation of the phase shifters. In some embodiments, it does this by using a custom Rademacher based PN sequence $P_I(i)$ of length N, where $i \in [1,m]$ indicates the PN sequence index and $l \in [0, N-1]$ is the antenna number. For example, in some embodiments, the Rademacher based PN sequences can be:
PN_0=-1 1 1 -1 1 1 -1 1
PN_1=-1 1 1 1 1 -1 1 1
PN_2=-1 1 -1 -1 -1 -1 1 -1
PN_3=1 -1 -1 -1 1 1 -1 1
PN_4=-1 -1 1 -1 1 1 -1 1
PN_5=-1 1 -1 1 -1 -1 -1 -1
PN_6=1 -1 -1 1 1 1 -1 1
PN_7=-1 -1 1 1 -1 -1 1 -1,
where "1" corresponds to no phase shift and "-1" corresponds to a 180 degree phase shift. (When used with vector modulators as described below, "-1" in these PNs can be changed to "1" and "1" in these PNs can be changed to "0".) While CS-DoA can use Rademacher based PN sequences in some embodiments, other types of PN sequences (such as m-sequences, gold sequences, etc.) can additionally or alternatively be used in some embodiments. Each PN sequence corresponds to a row in the CS-DoA sensing matrix $\Phi$ in some embodiments. By PN modulating the phase shifter phases, the phase shifter weight vector w has a non-linear phase relationship between antenna elements, unlike w in a CBF mechanism as described above. An example of this non-linear phase relationship is shown in graph 305 of FIG. 3.

In accordance with some embodiments, the results of the phase shifts can be seen in signals 304 at points 202. As illustrated in graph 306, the random perturbations between phase shifters 221, 222, 223, and 224 cause incident power to be collected from all possible DoA directions within the antenna array's field of view (FoV) from θ min to θ max.

This results in a spread composite antenna pattern with a wide spatial response. In some embodiments, the phases corresponding to the elements of the Rademacher sequence are 0 degrees or 180 degrees. Other sequences with more than 1 bit of resolution are also able to be used. $P_I(i)$ is changed m times where m<<N, each time resulting in a new composite antenna pattern and complex measurement consisting of ns samples at the output of the summer 231.

The array factors (AFs) when using CBF and CS-DoA are shown in equations 11 and 12, respectively, below where i in equation 12 is the PN sequence number:

$$AF_{cbf}(\theta) = \sum_{l=0}^{N-1} e^{jl(2\frac{\pi}{\lambda} d \sin(\theta) + \phi)} \tag{11}$$

$$AF_{CS-DoA}(\theta, i) = \sum_{l=0}^{N-1} e^{jl\left(2\left(\frac{\pi}{\lambda}\right) d \sin(\theta) + \frac{P_I(i)}{l}\right)} \tag{12}$$

Since CS-DoA only needs to make m measurements instead of the N sector scans that CBF needs, the CS-DoA compression factor over CBF is:

$$\Lambda = \frac{N}{m}. \tag{13}$$

CS has less sensitivity than CBF when performing an exhaustive scan at minimum sector size resolution. This loss in sensitivity F is proportional to the number of CS-DoA measurements used and, in essence, the CBF trades off detection speed for signal detection sensitivity as shown in equation (14) below:

$$\Gamma = 10 \log(\Lambda) \text{ (dB)}. \tag{14}$$

In some embodiments, although CBF needs to search through N angles and takes $N \cdot t_{detect}$ seconds, CS-DoA needs only $m \cdot t_{detect}$ seconds. This results in an energy consumption that is no longer quadratically related to N as shown in the following equation but rather through m:

$$E_{DSIC} = mN t_{detect} P_{ant}. \tag{15}$$

Note that this comparison assumes CBF does not change its sensitivity level.

When an unknown number of signals (and hence DoAs) are present, an unknown number of measurements may be needed. For this scenario, analysis of the OMP residue and signal detection threshold can be used to help reconfigure CS-DoA. For example, if five signals are present in the environment and CS-DoA is configured to find two signals with 90%/o probability of detection, the OMP residue will be large, indicating one of two things: (1) more than one signal is present and, therefore, more CS-DoA measurements are needed; and (2) the signal detection threshold should be set higher. For most cases, a pre-defined OMP threshold can be used.

Figure 4A:
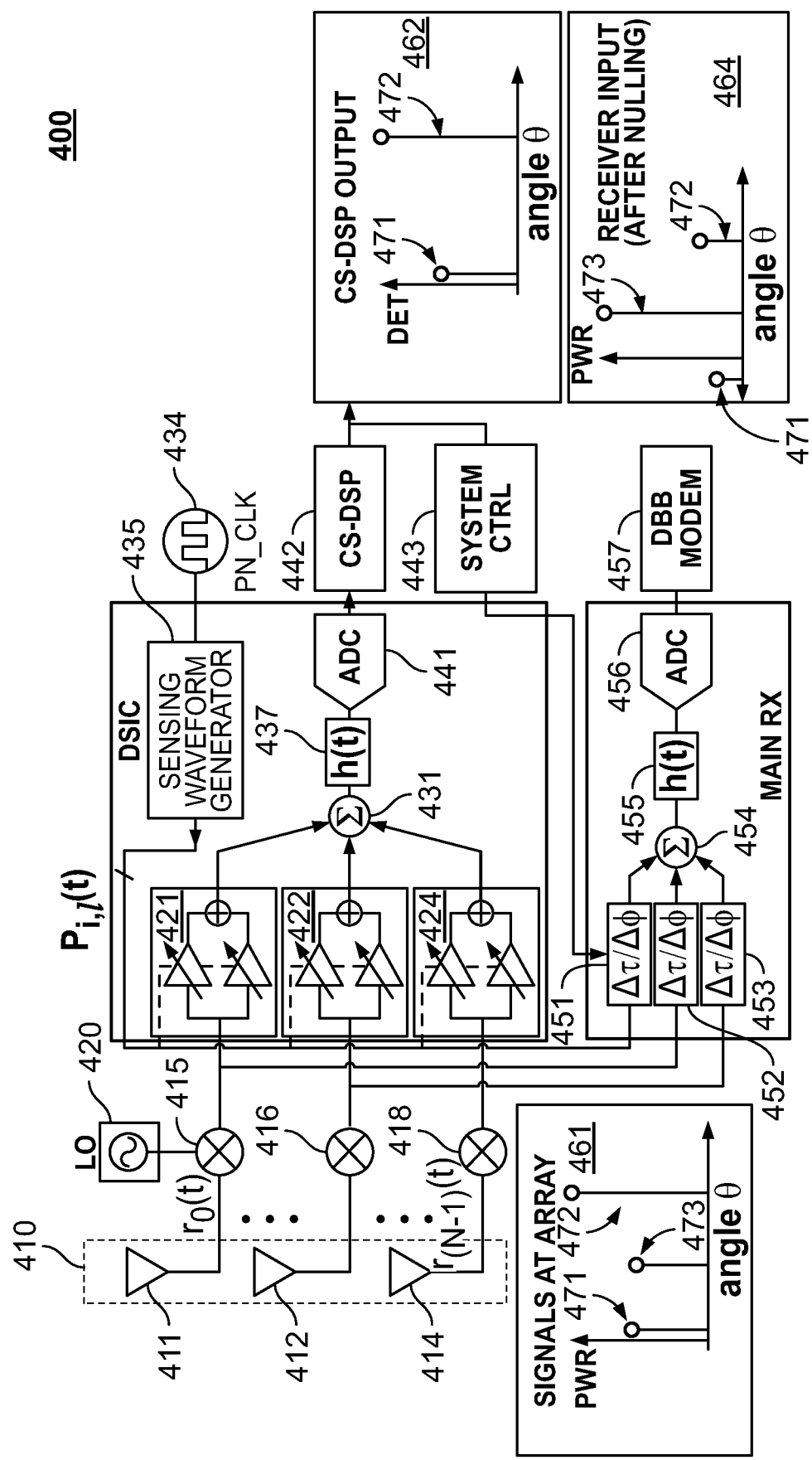
FIG. 4A illustrates an example of an architecture using parallel circuitry for detecting the direction of arrival of one or more interferers using compressive sampling and for suppressing the interferers using conventional beam forming in accordance with some embodiments.

FIG. 4A illustrates an example 400 of an architecture capable of using CS-DoA and CBF to detect the DoA of an SoI in accordance with some embodiments. As shown, architecture 400 includes a uniform linear array (ULA) 410 of antennas 411, 412, and 414, mixers 415, 416, 418, local oscillator source 420, vector modulators 421, 422, and 424, summer 431, pseudo-random number (PN) clock 434, sensing waveform generator 435, h(t) filter 437, analog-to-digital converter (ADC) 441, compressive sampling digital signal processor (CS-DSP) 442, system control circuit 443, time delay/phase shifter circuits 451, 452, 453, summer 454, h(t) filter 455, analog-to-digital converter (ADC) 456, and digital baseband modem 457. Vector modulators 421, 422, and 424 can also be replaced by other time delay/phase shift circuits in some embodiments.

Uniform linear array (ULA) 410 of antennas 411, 412, and 414 can be any suitable linear arrangement of antennas, in some embodiments. For example, in some embodiments, ULA 410 of antennas 411, 412, and 414 can be a linear arrangement of antennas space apart by the wavelength of the carrier frequency divided by two. However, other antenna spacings and geometries can be used such as uniform circular arrays (UCA), rectangular arrays or arrays of arbitrary geometry in some embodiments.

Mixers 415, 416, 418 can be any suitable mixers in some embodiments. For example, in some embodiments, mixers 415, 416, 418 can be mixers described below in connection with FIG. 5. The mixing stage can be located before or after phase-shifting/time-delay circuits in some embodiments.

Local oscillator source 420 can be any suitable local oscillator source, in some embodiments. For example, in some embodiments, local oscillator source 420 can be the local oscillator source described below in connection with FIG. 5.

Vector modulators 421, 422, and 424 can be any suitable vector modulators or time-delays or phase-shifters in some embodiments. For example, in some embodiments, vector modulators 421, 422, and 424 can be the vector modulators described below in connection with FIG. 5.

Summer 431 can be any suitable summer in some embodiments.

Pseudo-random number (PN) clock 434 can be any suitable pseudo-random number (PN) clock in some embodiments.

Sensing waveform generator 435 can be any suitable sensing waveform generator in some embodiments. For example, in some embodiments, sensing waveform generator can be the pseudo-random antenna weight generator described below in connection with FIG. 5.

h(t) filter 437 can be any suitable filter in some embodiments.

Analog-to-digital converter (ADC) 441 can be any suitable analog-to-digital converter in some embodiments.

Compressive sampling digital signal processor (CS-DSP) 442 can be any suitable compressive sampling digital signal processor in some embodiments. For example, in some embodiments, compressive sampling digital signal processor can be any suitable hardware processor, such as digital signal processor, a microprocessor, a special-purpose computer, a general-purpose computer, or any other suitable device suitable for performing compressive sampling processing as described herein.

System control circuit 443 can be any suitable control mechanism for controlling the operation of architecture 400 in some embodiments. For example, in some embodiments, system control circuit 443 can be any suitable hardware processor, such as digital signal processor, a microprocessor, a special-purpose computer, a general-purpose computer, or any other suitable device suitable for controlling the operation of architecture 400 as described herein.

Time delay/phase shifter circuits 451, 452, 453 can be any suitable time delay/phase shifter circuits, in some embodiments.

Summer 454 can be any summer, in some embodiments.

h(t) filter 455 can be any suitable filter, in some embodiments.

Analog-to-digital converter (ADC) 456 can be any suitable analog-to-digital converter, in some embodiments.

Digital baseband modem 457 can be any suitable digital baseband modem, in some embodiments.

In some embodiments, architecture 400 can operate as follows. Signals 461 an be received at ULA 410 of antennas 411, 412, and 414. As shown, the signals can include interferers 471 and 472 and desired signal 473. Using CS-DoA, the architecture can first determine the DoA of interferers 471 and 472 using vector modulators 421, 422, and 424, summer 431, pseudo-random number (PN) clock 434, sensing waveform generator 435, h(t) filter 437, analog-to-digital converter (ADC) 441, and compressive sampling digital signal processor (CS-DSP) 442. A CS-DSP output 462 shows the detected interferer signals 471 and 472, including their DoA angle θ. System control circuit 443 can then generate time delay or phase shift signals and provide those to time delay/phase shifter circuits 451, 452, 453 so that interferers 471 and 472 can be suppressed by time delay/phase shifter circuits 451, 452, 453, summer 454, and h(t) filter 455 using CBF. This will result in desired signal 473 having a higher relative power than interferers 471 and 472 at digital baseband model 457 as shown in 464.

Figure 4B:
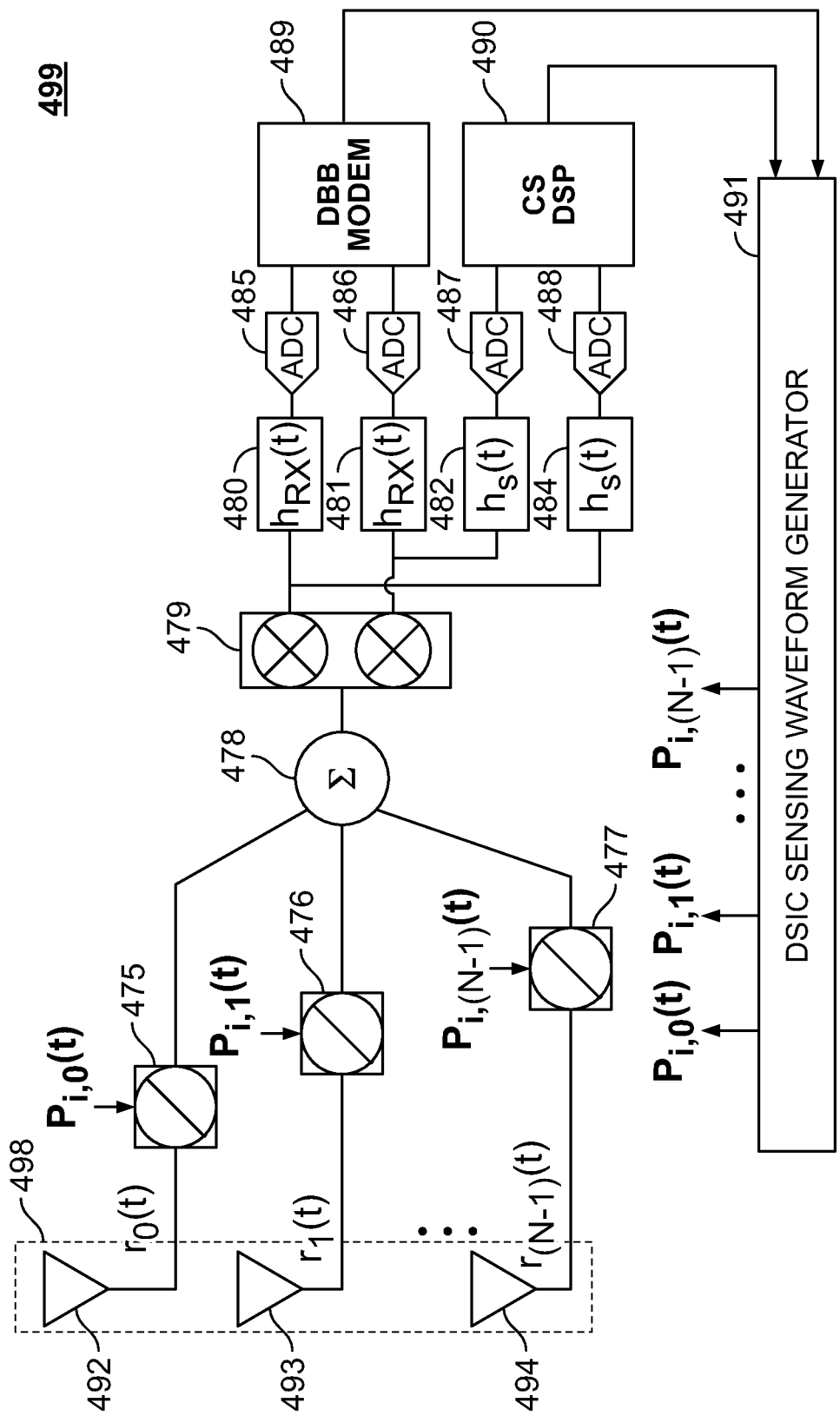
FIG. 4B illustrates an example of an architecture using shared circuitry for detecting the direction of arrival of one or more interferers using compressive sampling and for suppressing the interferers using conventional beam forming in accordance with some embodiments.

Turning to FIG. 4B, another example 499 of an architecture capable of using CS-DoA and CBF to detect the DoA of an SoI is shown in accordance with some embodiments. As illustrated, architecture 499 includes a ULA 498 of antennas 492, 493, and 494, mixers 475, 476, and 477, summer 478, mixers 479, filters 480, 481, 482, and 484, ADCs 485, 486, 487, and 488, digital baseband modem 489, CS DSP 490, and DSIC sensing waveform generator 491.

ULA 498 of antennas 492, 493, and 494 can be any suitable arrangement of antennas, in some embodiments. For example, in some embodiments, ULA 498 of antennas 492, 493, and 494 can be a linear arrangement of antennas space apart by the wavelength of the carrier frequency divided by two. Other antenna spacings and geometries can be used such as uniform circular arrays (UCA), rectangular arrays or arrays of arbitrary geometry in some embodiments.

Phase-shift/time-delay circuits 475, 476, and 477 can be any suitable phase-shift/time-delay in some embodiments. For example, in some embodiments, phase-shift/time-delay 475, 476, and 477 can be the phase-shift/time-delay circuits described below in connection with FIG. 5 (vector modulators). The mixing stage can be located before or after phase-shifting/time-delay circuits in some embodiments.

Summer 478 can be any suitable summer in some embodiments.

Mixers 479 can be any suitable mixers in some embodiments. For example, in some embodiments, mixers 479 can be the mixers described below in connection with FIG. 5.

Filters 480, 481, 482, and 484 can be any suitable filters in some embodiments.

ADCs 485, 486, 487, and 488 can be any suitable analog-to-digital converters in some embodiments.

Digital baseband modem 489 can be any suitable digital baseband modem in some embodiments.

CS DSP 490 can be any compressive sampling digital signal processor in some embodiments. For example, in some embodiments, compressive sampling digital signal processor can be any suitable hardware processor, such as digital signal processor, a microprocessor, a special-purpose computer, a general-purpose computer, or any other suitable device suitable for performing compressive sampling processing as described herein.

DSIC sensing waveform generator 491 can be any suitable sensing waveform generator in some embodiments. For example, in some embodiments, DSIC sensing waveform generator can be the pseudo-random antenna weight generator described below in connection with FIG. 5.

Architecture 499 can operate similarly to architecture 400 in that it can first use CS-DoA to determine the DoA of interferers and then use CBF to suppress the interferers in some embodiments. However, it can do so using shared components. For example, based on signals $p_{i,0}(t)$, $p_{i,1}(t), \ldots, p_{i,(N-1)}(t)$ (which can be different when architecture 499 is performing CS-DoA and CBF), mixers can either modulate signals $r_0(t), r_1(t), \ldots, r_{(N-1)}(t)$ using PNs when performing CS-DoA or can time-delay or phase shift signals $r_0(t), r_1(t), \ldots, r_{(N-1)}(t)$ when performing CBF. The resulting signals can then be summed by summer 478 whether performing CS-DoA or CBF mode.

In some embodiments, CS-DoA can be implemented at either RF or baseband. In the case of FIG. 4B, the phase/time-delay weights (475, 476, 477) are implemented at RF with mixer 479 downconverting the RF signal to baseband.

The signals can then be filtered by filters 480, 481, 482, and 484 and digitized by ADCs 484, 486, 487, and 488. When performing CS-DoA, CS DSP 490 can perform any suitable signal processing (such as performing an OMP algorithm) and provide information on interferers to DSIC sensing waveform generator 491. Generator 491 can then output signals $p_{i,0}(t), p_{i,1}(t), \ldots, p_{i,(N-1)}(t)$ for CBF to suppress the interferers and receive the desired signal at DBB modem 489.

Figure 5:
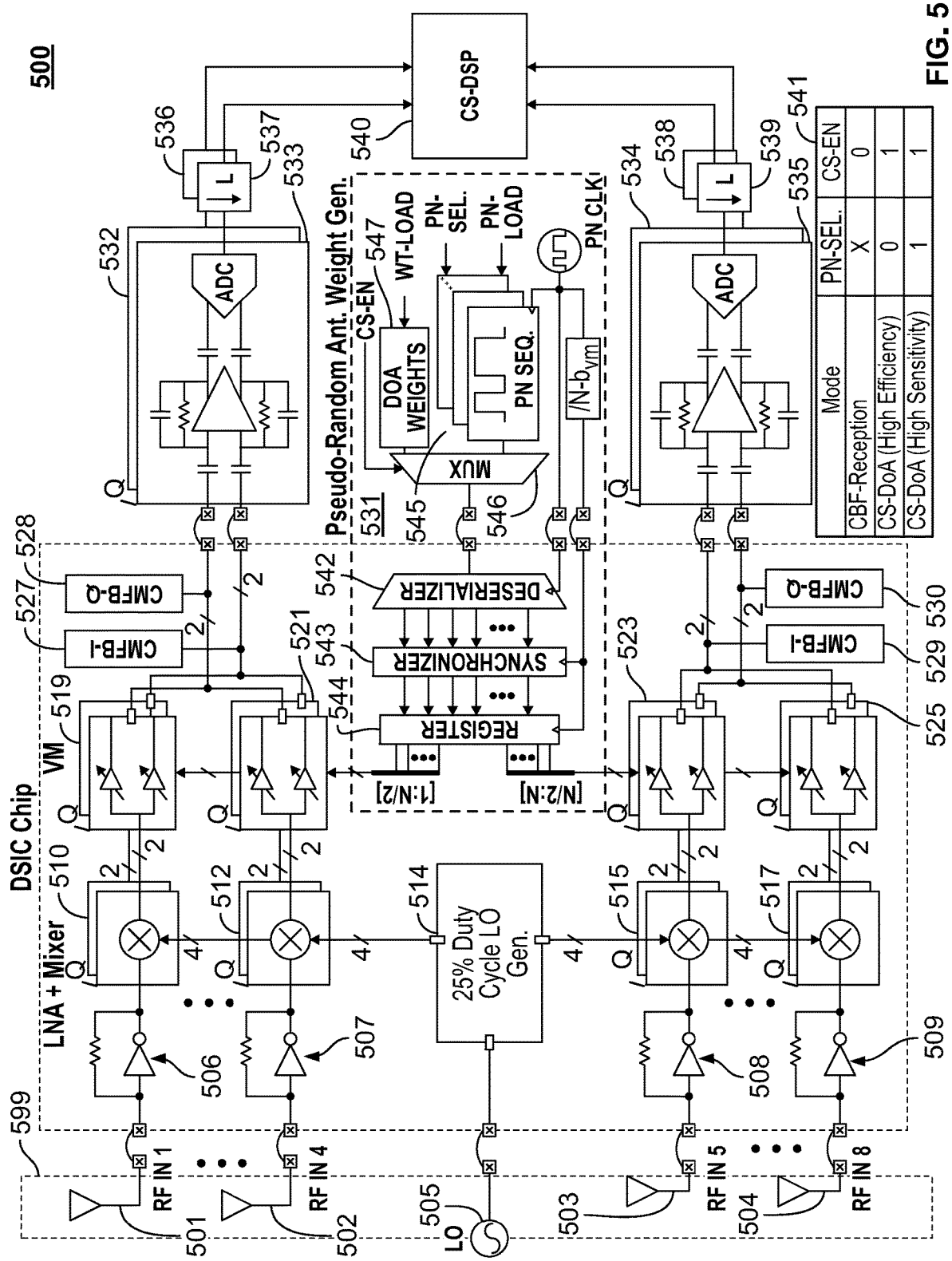
FIG. 5 illustrates an example of hardware that can be used to implement compressive sampling for direction of arrival detection in conjunction with conventional beam forming in accordance with some embodiments.

Turning to FIG. 5, an example 500 of hardware for implementing a direct space-to-information converter is shown. As illustrated, hardware 500 includes uniform linear array (ULA) 599 of antennas 501, 502, 503, and 504, low noise amplifiers (LNAs) 506, 507, 508, and 509, mixers 510, 512, 515, and 517, vector modulators 519, 521, 523, and 525, common mode feedback (CMFB) networks 527, 528, 529, and 530, pseudo random antenna weight generator 531, transimpedance amplifier (TIA) and ADC circuits 532, 533, 534, and 535, optional decimation 536, 537, 538, and 539, and compressive sampling digital signal processor (CS-DSP) 540.

Uniform linear array 599 of antennas 501, 502, 503, and 504 can be any suitable arrangement of antennas, in some embodiments. For example, in some embodiments, ULA 599 of antennas 501, 502, 503, and 504 can be a linear arrangement of antennas space apart by the wavelength of the carrier frequency divided by two. Other antenna spacings and geometries can be used such as uniform circular arrays (UCA), rectangular arrays or arrays of arbitrary geometry in some embodiments.

Low noise amplifiers (LNAs) 506, 507, 508, and 509 can be any suitable low noise amplifiers in some embodiments. For example, in some embodiments, low noise amplifiers can be the low noise amplifiers described below in connection with FIG. 6.

Mixers 510, 512, 515, and 517 can be any suitable mixers in some embodiments. For example, in some embodiments, mixers 510, 512, 515, and 517 can be the mixers described below in connection with FIG. 6. The mixing stage can come before the phase-shifter/time-delay stage as well in some embodiments.

Vector modulators 519, 521, 523, and 525 can be any suitable vector modulators in some embodiments. For example, in some embodiments, vector modulators 519, 521, 523, and 525 can be the vector modulators described below in connection with FIGS. 8 and 9. As mentioned above, other methods of phase-shifting or time-delaying the received signal can be used such as time-delay circuits or phase shifters in some embodiments.

Figure 10:
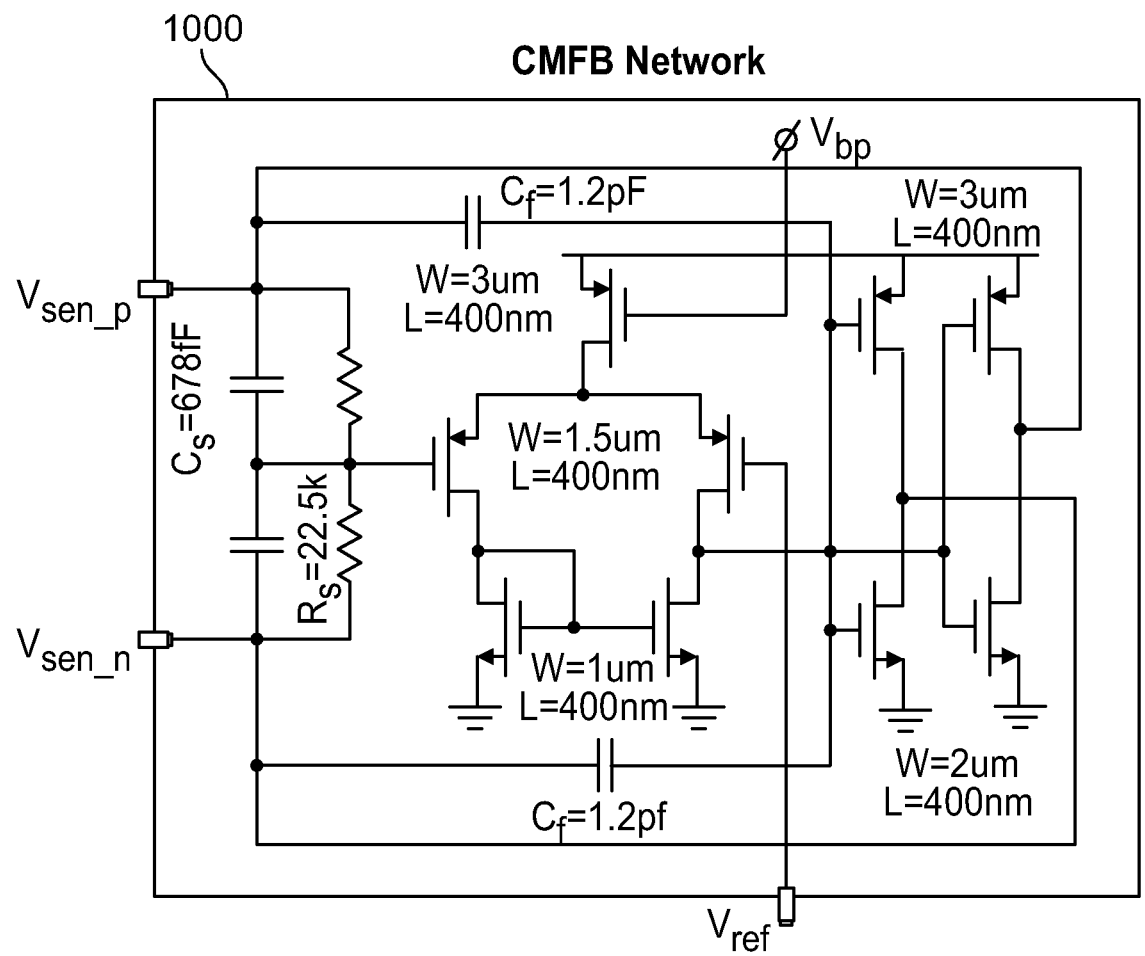
FIG. 10 illustrates an example of a common mode feedback network that can be used in the hardware of FIG. 5 in accordance with some embodiments.

Common mode feedback (CMFB) networks 527, 528, 529, and 530 can be any suitable common mode feedback networks in some embodiments. For example, in some embodiments, CMFB networks 527, 528, 529, and 530 can be the CMFB networks described below in connection with FIG. 10.

Pseudo-random antenna weight generator 531 can be any suitable pseudo-random antenna weight generator in some embodiments. For example, in some embodiments, pseudo-random antenna weight generator 531 can be the pseudo-random antenna weight generator described below in connection with FIG. 5.

Transimpedance amplifier (TIA) and ADC circuits 532, 533, 534, and 535 can be any suitable TIA and ADC circuits in some embodiments.

Decimation 536, 537, 538, and 539 can be any suitable decimation circuit or algorithm in some embodiments. For example, in some embodiments, CIC decimation or FIR decimation can be used.

Compressive sampling digital signal processor (CS-DSP) 540 can be any suitable compressive sampling digital signal processor in some embodiments. For example, in some embodiments, compressive sampling digital signal processor can be any suitable hardware processor, such as digital signal processor, a microprocessor, a special-purpose computer, a general-purpose computer, or any other suitable device suitable for performing compressive sampling processing as described herein.

As shown in FIG. 5, hardware 500 includes eight RF front ends in some embodiments, although any suitable number of front ends can be used in some embodiments. In some embodiments, each front end can include any suitable LNA (e.g., LNA 506, 507, 508, and 509), such as a shunt-shunt feedback inverter-based LNA, such as LNA 600 of FIG. 6. As shown, LNA 600 can be formed from a PMOS transistor, an NMOS transistor, and a feedback resistor $R_f$ in some embodiments. Any suitable transistors and feedback resistor can be used in some embodiments. For example, PMOS and NMOS transistors with transconductances of 22.6 mS and a feedback resistor with a resistance of 353Ω can be used in some embodiments.

Figure 6:
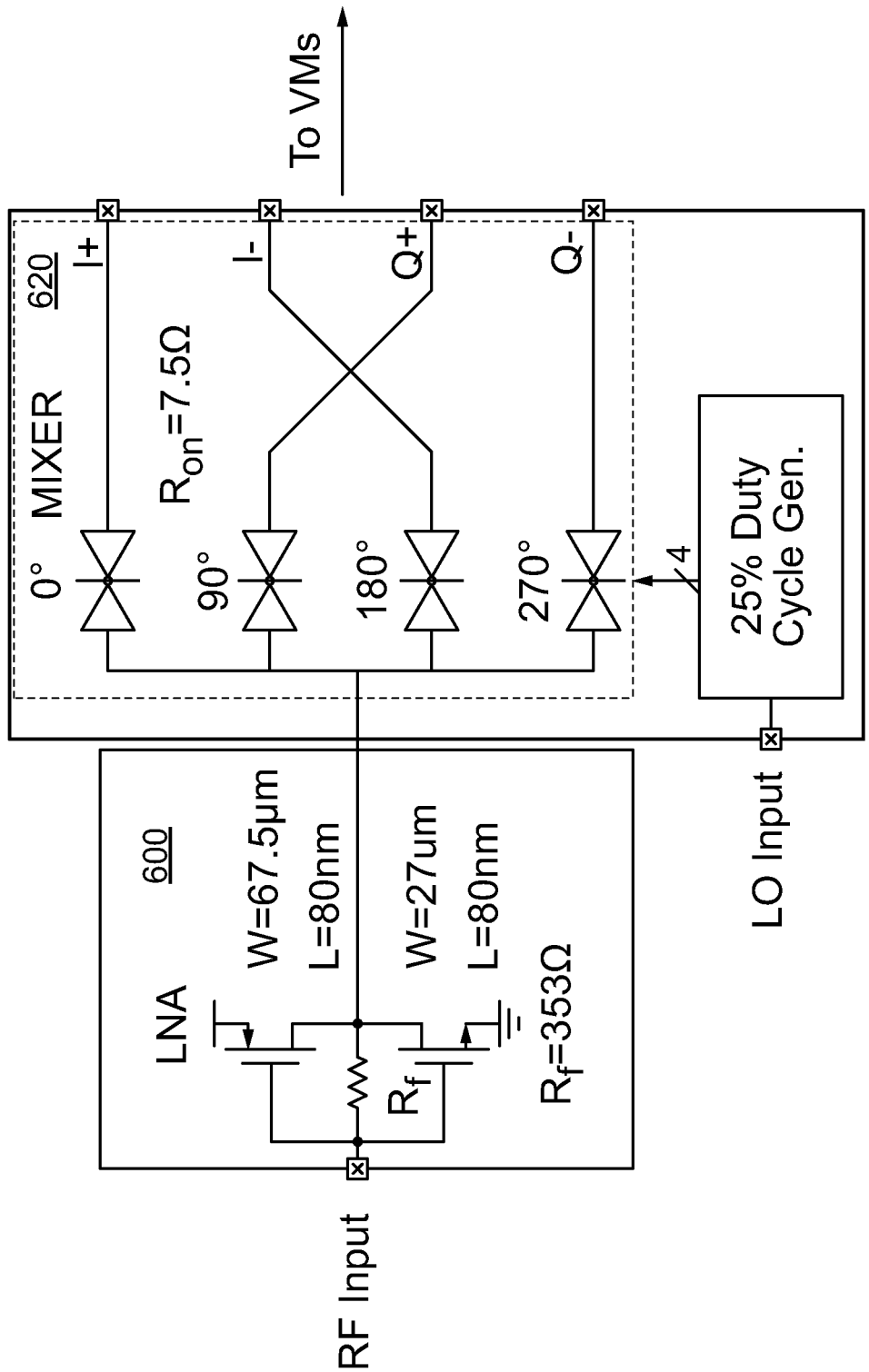
FIG. 6 illustrates an example of a low noise amplifier and a mixer that can be used in a front end of the hardware of FIG. 5 in accordance with some embodiments.

Each front end can also include any suitable mixer (e.g., mixers 510, 512, 515, and 517), such as mixer 620 of FIG. 6. As shown, mixer 620 can be passive, transmission gate based and require a four-phase local oscillator (LO). The ON resistance Ron of the mixer transmission gates can be any suitable value, such as 7.5Ω, in some embodiments.

Figure 7:
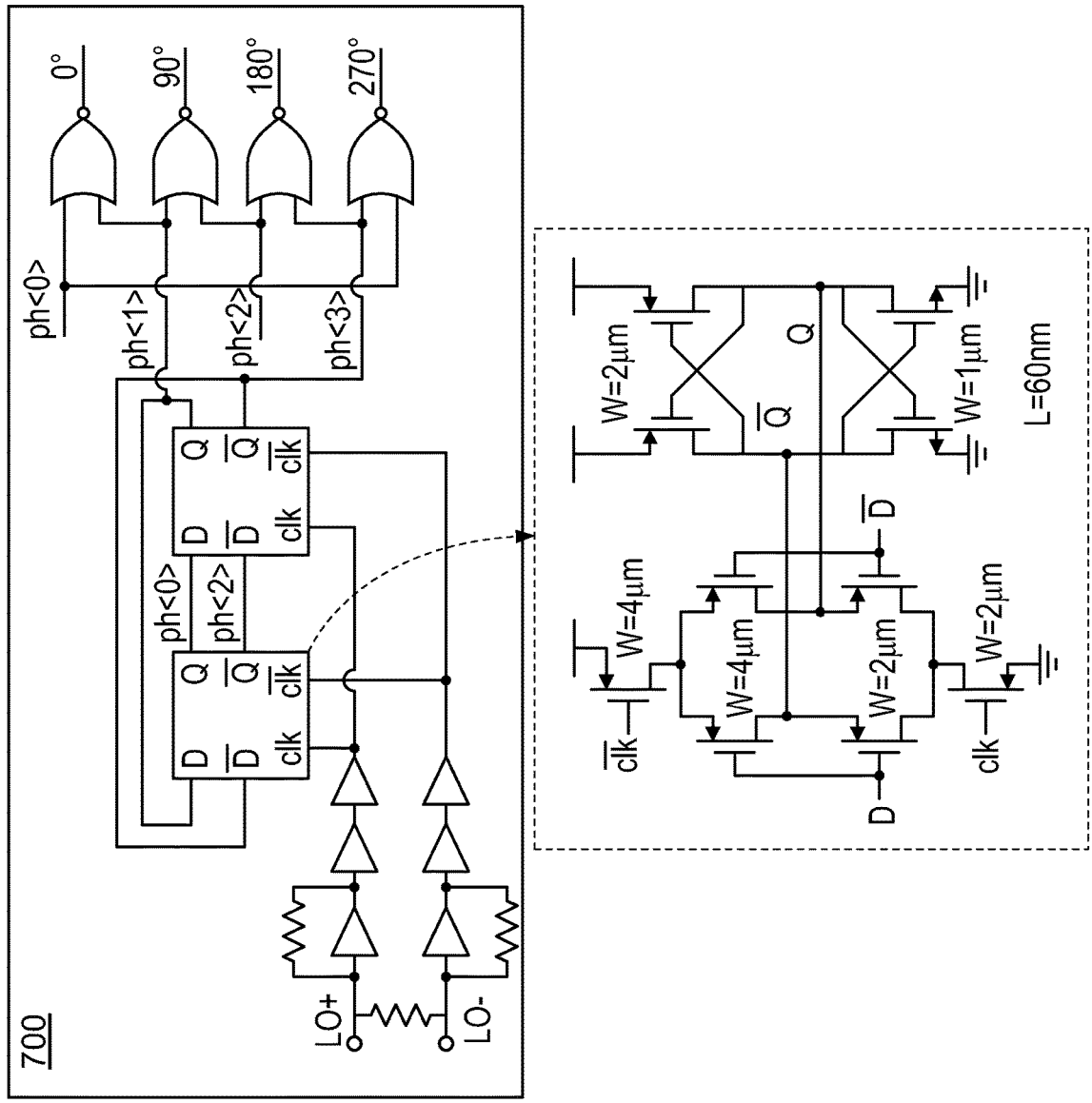
FIG. 7 illustrates an example of a local oscillator generator that can be used in the hardware of FIG. 5 in accordance with some embodiments.

The LO paths to the mixers can include eight, matched LO lines fed by 25% duty-cycle LO generator 514 in some embodiments. Any suitable local oscillator generator can be used for local oscillator generator 514 in some embodiments. For example, in some embodiments, a 25% duty-cycle LO generator can be implemented using generator 700 shown in FIG. 7. The LO lines can be buffered at both the generator and the mixer inputs and can be carefully routed to ensure equal length and parasitics in some embodiments. An accurate LO generator is important because phase errors in the LO path can translate to vector modulators 519, 521, 523, and 525, resulting in unwanted phase rotations in the baseband outputs, which could manifest as off-center beam errors and nulls.

Vector modulators 519, 521, 523, and 525 can be any suitable vector modulators in some embodiments. For example, vector modulators 519, 521, 523, and 525 can be implemented as shown in FIGS. 8 and 9 in some embodiments.

Figure 8:
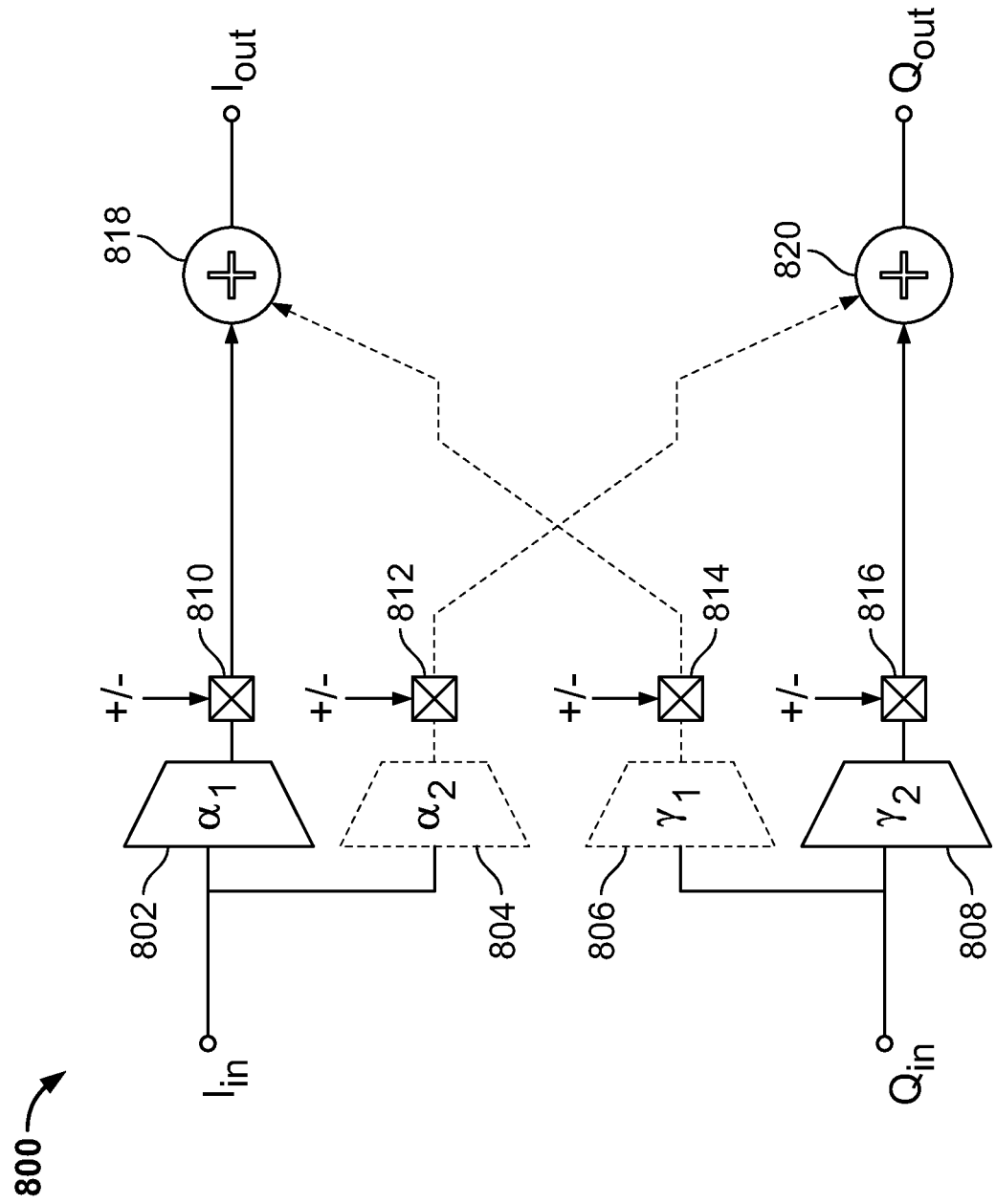
FIG. 8 illustrates an example of a vector modulator that can be used in the hardware of FIG. 5 in accordance with some embodiments.
Figure 9:
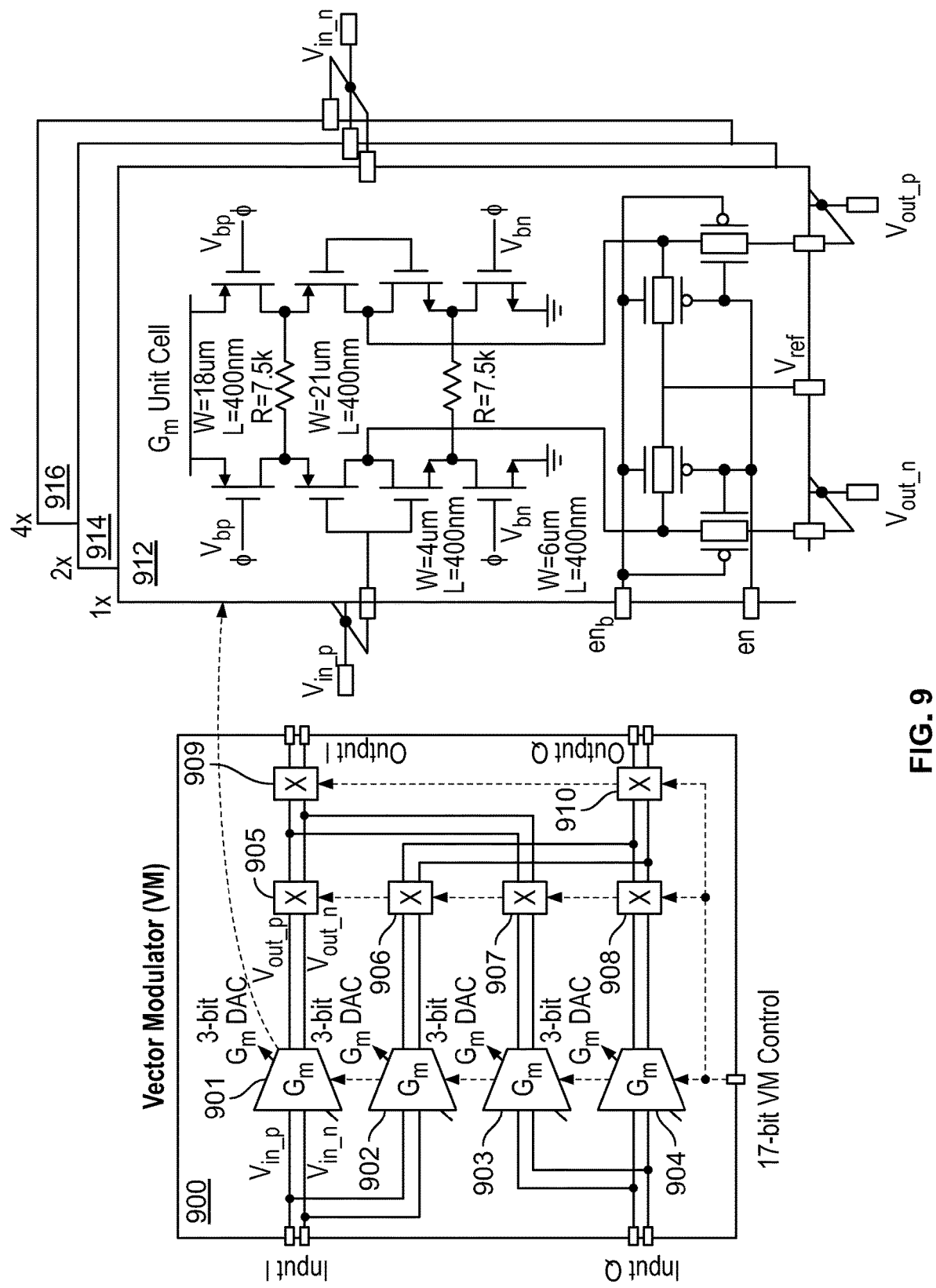
FIG. 9 illustrates another example of a vector modulator that can be used in the hardware of FIG. 5 in accordance with some embodiments.

Turning to FIG. 8, in some embodiments, vector modulators 519, 521, 523, and 525 can be implemented using vector modulator 800 of FIG. 8. As shown, vector modulator 800 can include variable transconductors 802, 804, 806, and 808, switches 810, 812, 814, and 816, and adders 818 and 812 in some embodiments. Although 818 and 820 are described as being adders, because the outputs of mixers 818, 812, 814, and 816 are current signals, these adders can simply be connections that allow the currents in the paths to add together, in some embodiments.

As described above, phase shifts can be performed using the vector modulators. By adjusting the weights (transconductances) $\alpha_1$, $\alpha_2$, $\gamma_1$, and $\gamma_2$ of transconductors 802, 804, 806, and 808, the phase of the input signal to the vector modulator can be changed via a rotation of its Cartesian coordinates.

When performing CBF, the VM's crossover paths (that is the dashed paths in FIG. 8) are enabled. The weighted I and Q outputs are:

$$I_{out} = I_{in}\alpha_1 + Q_{in}\gamma_1 \quad (16)$$

$$Q_{out} = I_{in}\alpha_2 + Q_{in}\gamma_2. \quad (17)$$

Therefore; $\alpha_1$ is cos φ, $\gamma_2$ is cos α, $\gamma_1$ is −sin φ, and $\alpha_2$ is sin φ, where φ is the desired phase shift.

For CS-DoA, the VM's crossover paths (the dashed lines in FIG. 8) are disabled. Since now only the polarities of the I and Q paths are changed, a VM's output at element 1 and PN sequence chip i is:

$$I_{out,I}(i) = P_I(i)I_{in}(\alpha_1) \quad (18)$$

$$Q_{out,I}(i) = P_I(i)Q_{in}(\gamma_1) \quad (19)$$

where $P_I(i)$ is the PN sequence.

Turning to FIG. 9, in some embodiments, the vector modulators 519, 521, 523, and 525 can be implemented using vector modulator 900. As illustrated, vector modulator 900 can include variable transconductors 901, 902, 903, and 904 and switch matrices 905, 906, 907, 908, 909, and 910.

As also shown in FIG. 9, transconductors 901, 902, 903, and 904 can include three (or any suitable number) weighted transconductance cells 912, 914, and 916. Cell 912 provides 1× a unit value, cell 914 provides 2× a unit value, and cell 916 provides 4× a unit value. By using these cells in any suitable combination as controlled by a three-bit control line, output between 0× and 7× the unit value can be provided by each transconductor. The VM weights $\alpha_1$, $\alpha_2$, $\gamma_1$, and $\gamma_2$ can be controlled by multiple transconductance cells sized in 1×, 2×, and 4× unit cells to deliver five-bits of phase-amplitude resolution when performing CBF (three-bits per quadrant, 4 bits for each half and 5 bits total) and four-bits of phase-amplitude resolution when performing CS-DoA with the crossover switches off.

As shown in FIG. 9, each VM unit cell can be a current reuse, degenerated common-source amplifier and can be enabled/disabled via enable (en and $en_b$) pins, in some embodiments.

In some embodiments, switch matrices 905, 906, 907, 908, 909, and 910 can be constructed from transmission gates that perform: a complex multiply when performing CBF; and polarity switching of the I/Q outputs when performing CS-DoA.

As shown in FIG. 9, in some embodiments, the total number of control bits each VM requires can be 17: three bits for each of $\alpha_1$, $\alpha_2$, $\gamma_1$, and $\gamma_2$ (for a total of 12 bits); and five bits for polarity and mode control of the switch matrices.

In some embodiments, as shown in FIG. 5, pseudo-random antenna weight generator 531 sends control bits to the VMs via a deserialized bitstream (using deserializer 542, synchronizer 543, and register 544) sent at a clock rate of $(f_{PN}/N \cdot b_{vm})$ where $f_{PN}$ is the rate of the PN sequence clock (PN CLK in FIG. 5) and $b_{vm}$ is the number of control bits used for each VM.

Each bank of four VMs is connected to a common-mode feedback (CMFB) circuit with a unity-gain bandwidth of 90 MHz in some embodiments. Any suitable CMFB network can be used in some embodiments, such as CMFB 1000 of FIG. 10. The current outputs of the VM's can be combined (e.g., off-chip), summed, and converted to voltages via a bank of TIAs (in 532, 533, 534, and 535) before being sampled (by ADCs also in 532, 533, 534, and 535), in some embodiments.

Figure 11:
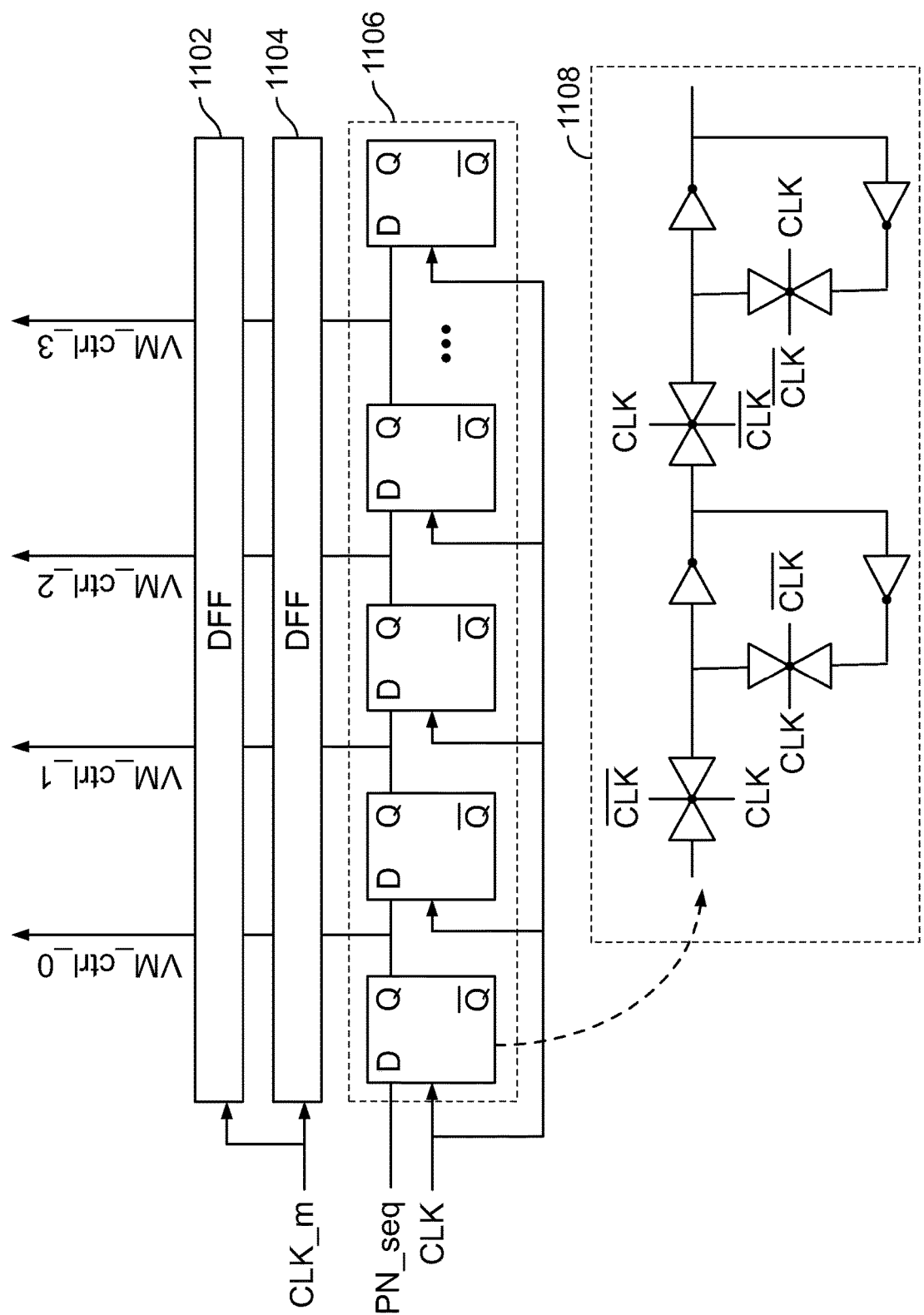
FIG. 11 illustrates an example of a serializer-deserializer that can be used in the hardware of FIG. 5 in accordance with some embodiments.

In some embodiments, pseudo-random antenna weight generator 531 includes on-chip and off-chip sections. In some embodiments, the on-chip section can be designed as a shift-register-based serializer-deserializer (SERDES) receiver as shown in FIG. 11 (see below). In some embodiments, this receiver can have any suitable parameters, such as a maximum clock rate of 300 MHz. The SERDES receiver can be loaded via an off-chip lookup table 545 that contains multiple PN sequences (each corresponding to a composite antenna pattern in some embodiments) for performing CS-DoA, an off-chip lookup table 547 that contains weights for performing CBF, and a multiplexer 546. When in performing CS-DoA, PN sequences can be selected and loaded by the PN-SEL and PN-LOAD signals shown in FIG. 5. When performing CBF, antenna weights can be controlled by the WT-LOAD signal shown in FIG. 5. Finally, the CS-EN signal shown in FIG. 5 can be used to control which mode (e.g., CS-DoA or CBF) is currently selected.

As shown in FIG. 11, in some embodiments, the SERDES receiver in the pseudo-random antenna weight generator can include D flip-flop synchronizer register banks 1102 and 1104 and a D flip-flop serializer bank 1106. For clarity, FIG. 11 only shows portions of the SERDES receiver corresponding to four VMs. The components shown can be expanded to cover all eight (or any suitable number of VMs) shown in FIG. 5.

Each of register banks 1102 and 1104 can contain any suitable number of flip-flops, such as 68 flip-flops each. Each of register banks 1102 and 1104 can have four groups of 17 flip-flops. Each group of 17 flip-flops can hold the state for the 17 control bits for one of eight VMs. Serializer bank 1106 can have any suitable number of flip-flops, such as two to synchronize between clock domains. Each of the flip flops in banks 1102, 1104, and 1106 can be formed in any suitable manner such as using transmission gates as shown in D flip-flop 1108 of FIG. 11.

In some embodiments, the pseudo-random antenna weight generator and the CMFB circuits determine the maximum rate that the PN sequences can propagate across the down conversion paths. This rate, in turn, limits the maximum speed that an SoI can be moving spatially.

In some embodiment, the DSIC Chip shown in FIG. 5 can be "daisy chained" into other DSIC chips by feeding a serial output of the SERDES receiver into the waveform generator input (SERDES receiver) of another DSIC. This daisy chaining can be used to increase the number of possible antenna elements.

Although particular number of various components are described herein for the purpose of illustration, any suitable number of any suitable components can be used in some embodiments. For example, any suitable number (e.g., 2, 4, 8, 16, 32, etc.) antennas can be used. Likewise, as another example, any suitable number of LNAs, mixers, LO signals, VMs, ADCs, filters, summers, time delays, phase shifters, PNs, etc. can be used in some embodiments.

In some embodiments, any suitable computer readable media can be used for storing instructions for performing functions and/or processes described herein. For example, in some embodiments, instructions for performing an orthogonal match pursuit algorithm as described above can be stored on a computer readable media so that those instructions can be executed by a hardware processor (e.g., compressive sampling digital signal processor 442 (FIG. 4A), 490 (FIG. 4B), or 540 (FIG. 5)) configured to determine the direction of arrival of a signal of interest using compressive sampling as described above. Any additional or alternative functions can be performed by instructions stored on computer readable media in some embodiments. In some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, circuits and methods for using compressive sampling to detect direction of arrival of a signal of interest are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for using compressed sensing to detect direction of arrival of a signal of interest, comprising:
   a plurality of receiver paths, each comprising:
      a unique one of a plurality of antennas configured to receive the signal of interest and produce a received signal; and
      a modulator configured to receive a modulator input signal based on the received signal produced by the antenna in the path, to modulate the modulator input signal at multiple points in time based on different ones of a plurality of pseudo-random numbers, and to produce a plurality of modulated output signals for the path in response to the modulating of the modulator input signal at the multiple points in time;
   a summer configured to, for each of the multiple points in time, sum across each of the plurality of receiver paths one of the plurality of modulated output signals for the path corresponding to the point in time, to produce a plurality of sum signals each corresponding to one of the multiple points in time; and
   a hardware processor configured to receive the plurality of sum signals, and to perform a compressed sensing recovery algorithm to recover the direction of arrival of the signal of interest in physical space with respect to the plurality of antennas.

2. The circuit of claim 1, wherein each of the plurality of receiver paths also includes a mixer that downconverts the received signal to product the modulator input signal.

3. The circuit of claim 1, wherein the plurality of modulated output signals produced by each of the plurality of receiver paths are current signals and wherein the summer is a connection that combines current signals.

4. The circuit of claim 1, further comprising an analog to digital converter that samples the plurality of sum signals.

5. The circuit of claim 1, wherein the hardware processor is a digital signal processor.

6. The circuit of claim 1, wherein the compressed sensing recovery algorithm is an orthogonal matching pursuit algorithm.

7. The circuit of claim 1, wherein the modulator is a vector modulator.

8. The circuit of claim 1, wherein the modulator is a phase shifter.

9. The circuit of claim 8, wherein the modulator is further configured to modulate the modulator input signal at other multiple points in time based on a desired phase shift.

10. The circuit of claim 9, wherein the hardware processor is configured to perform a conventional beam forming process.

11. A method for using compressed sensing to detect direction of arrival of a signal of interest, comprising:
    in each of a plurality of receiver paths,
       receiving the signal of interest and producing a received signal using a unique one of a plurality of antennas; and
       using a modulator to:
          receive a modulator input signal based on the received signal produced by the antenna in the path;
          modulate the modulator input signal at multiple points in time based on different ones of a plurality of pseudo-random numbers; and
          produce a plurality of modulated output signals for the path in response to the modulating of the modulator input signal at the multiple points in time;

using a summer, for each of the multiple points in time, summing across each of the plurality of receiver paths one of the plurality of modulated output signals for the path corresponding to the point in time, to produce a plurality of sum signals each corresponding to one of the multiple points in time; and performing a compressed sensing recovery algorithm to recover the direction of arrival of the signal of interest in physical space with respect to the plurality of antennas.

12. The method of claim 11, further comprising downconverting the received signal to product the modulator input signal.

13. The method of claim 11, wherein the plurality of modulated output signals produced by each of the plurality of receiver paths are current signals and wherein the summer is a connection that combines current signals.

14. The method of claim 11, further comprising sampling the plurality of sum signals.

15. The method of claim 11, wherein the compressed sensing recovery algorithm is performed by a digital signal processor.

16. The method of claim 11, wherein the compressed sensing recovery algorithm is an orthogonal matching pursuit algorithm.

17. The method of claim 11, wherein the modulator is a vector modulator.

18. The method of claim 11, wherein the modulator is a phase shifter.

19. The method of claim 18, further comprising using the modulator to modulate the modulator input signal at other multiple points in time based on a desired phase shift.

20. The method of claim 19, further comprising performing a conventional beam forming process.

* * * * *